Feb. 3, 1970  N. A. SCHUSTER  3,493,850
APPARATUS FOR INVESTIGATING FORMATIONS SURROUNDING A BOREHOLE
INCLUDING MEANS FOR GENERATING OPPOSITE POLARITY CURRENT
FLOW ON OPPOSITE SIDES OF THE BOREHOLE
Filed Jan. 20, 1964  6 Sheets-Sheet 1
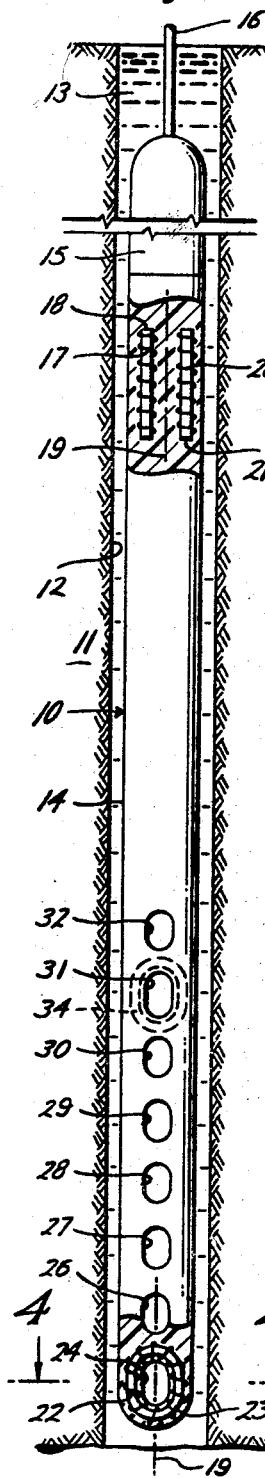
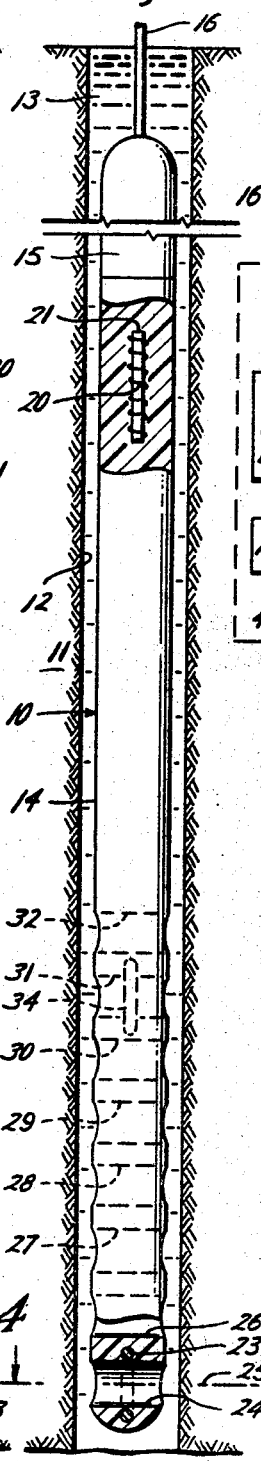
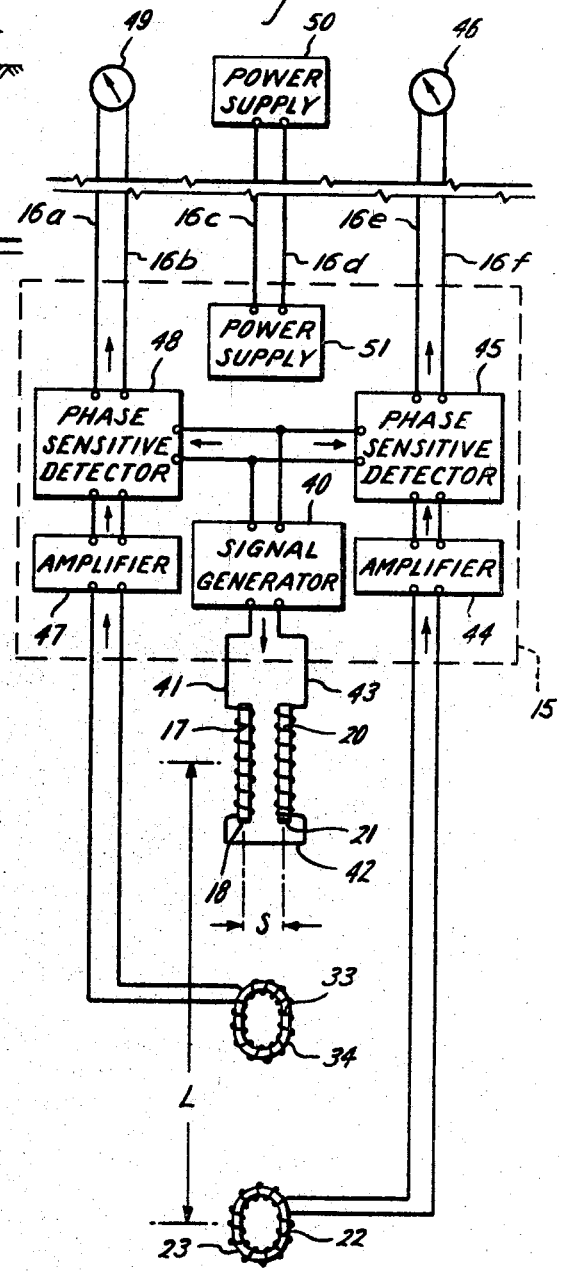
Nick A. Schuster
INVENTOR.
BY Richard E. Bee
ATTORNEY

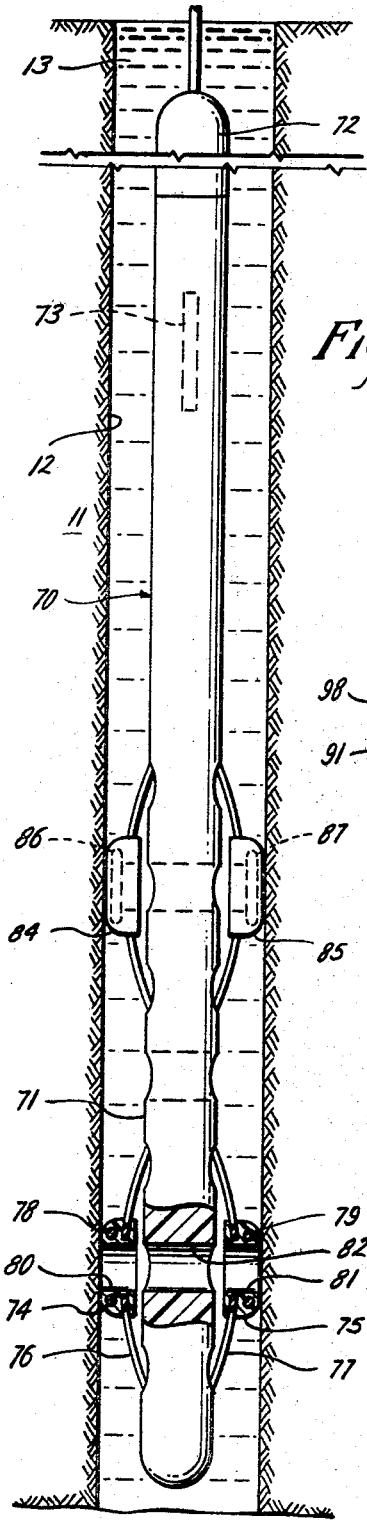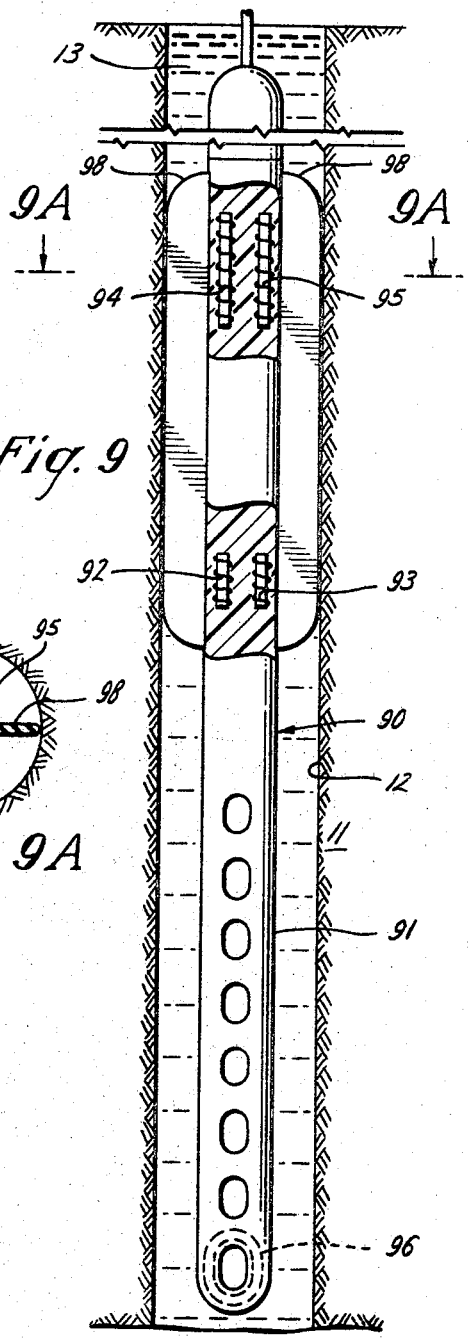

Feb. 3, 1970   N. A. SCHUSTER   3,493,850
APPARATUS FOR INVESTIGATING FORMATIONS SURROUNDING A BOREHOLE
INCLUDING MEANS FOR GENERATING OPPOSITE POLARITY CURRENT
FLOW ON OPPOSITE SIDES OF THE BOREHOLE
Filed Jan. 20, 1964                         6 Sheets-Sheet 4
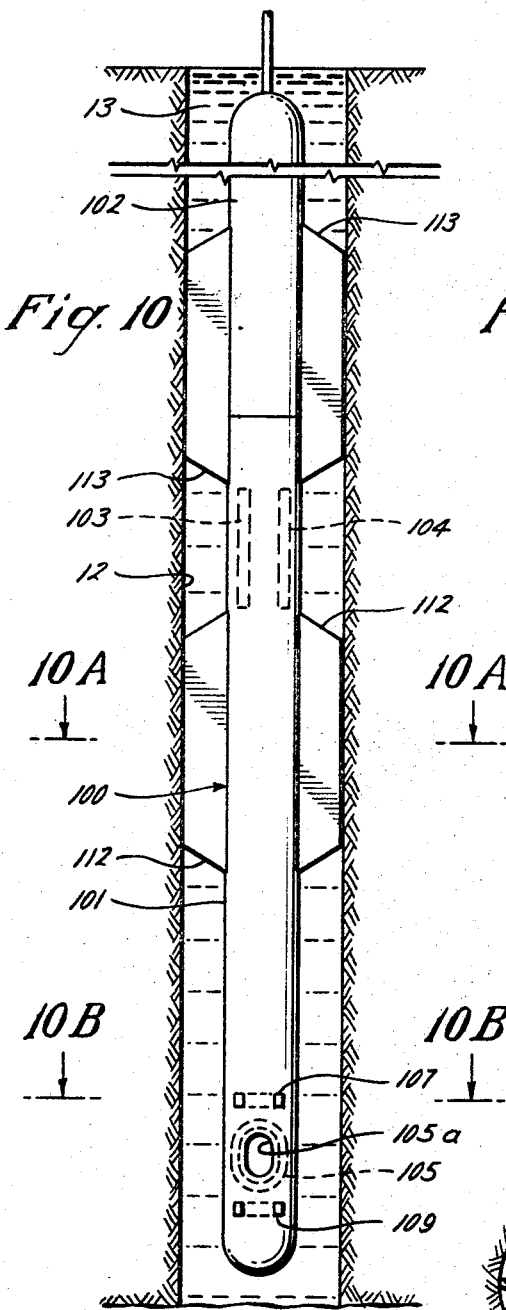
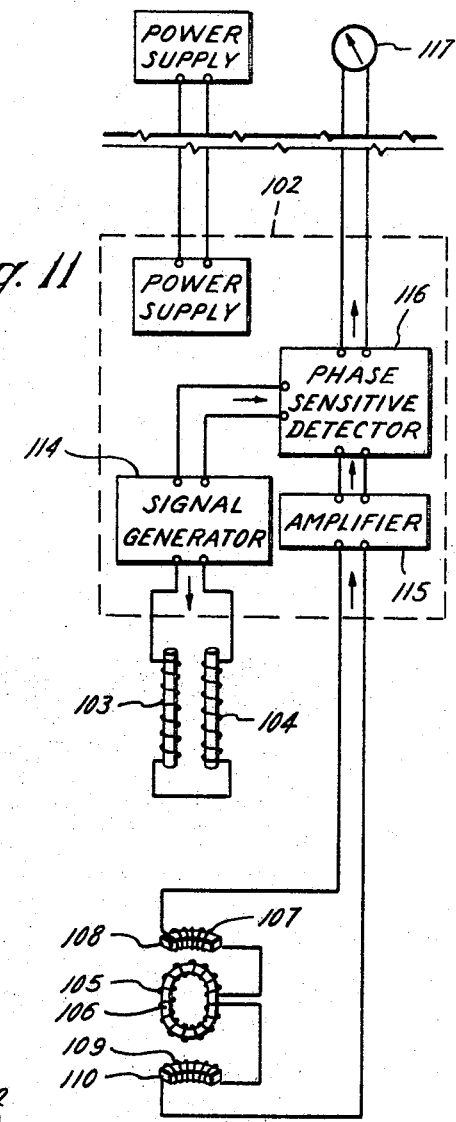
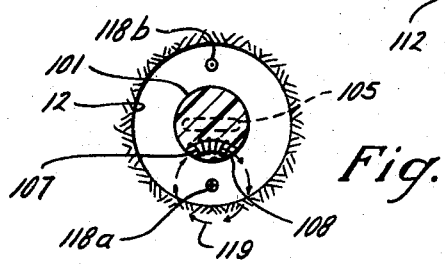
Nick A. Schuster
INVENTOR.
BY Richard E. Bee
ATTORNEY Feb. 3, 1970          N. A. SCHUSTER          3,493,850
APPARATUS FOR INVESTIGATING FORMATIONS SURROUNDING A BOREHOLE
INCLUDING MEANS FOR GENERATING OPPOSITE POLARITY CURRENT
FLOW ON OPPOSITE SIDES OF THE BOREHOLE
Filed Jan. 20, 1964                           6 Sheets-Sheet 5
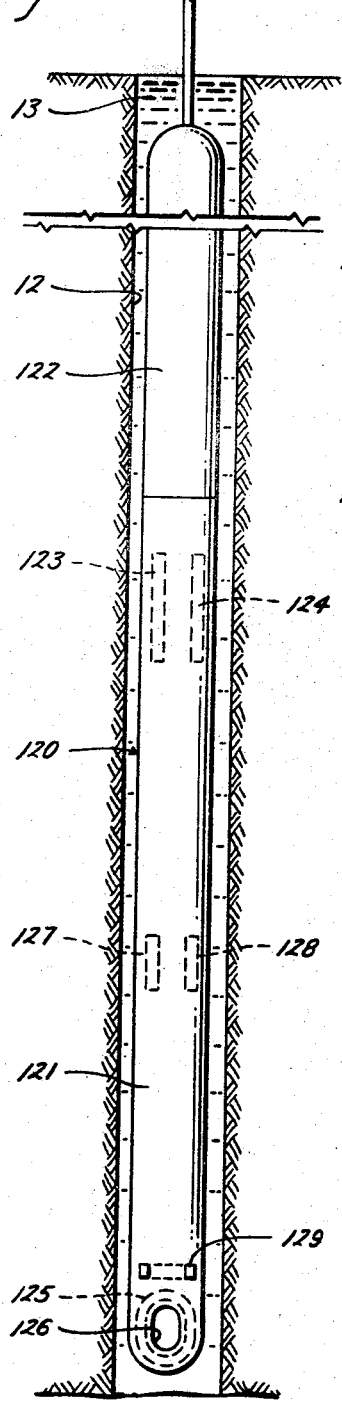
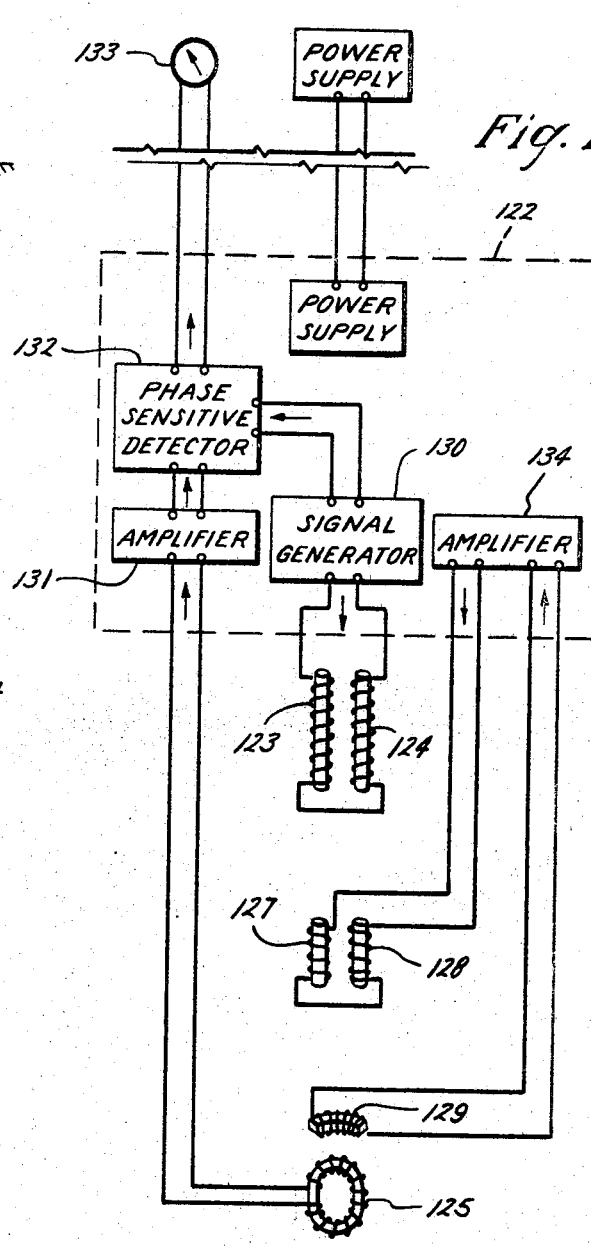
Nick A. Schuster
INVENTOR.
BY *Richard E. Bee*
ATTORNEY

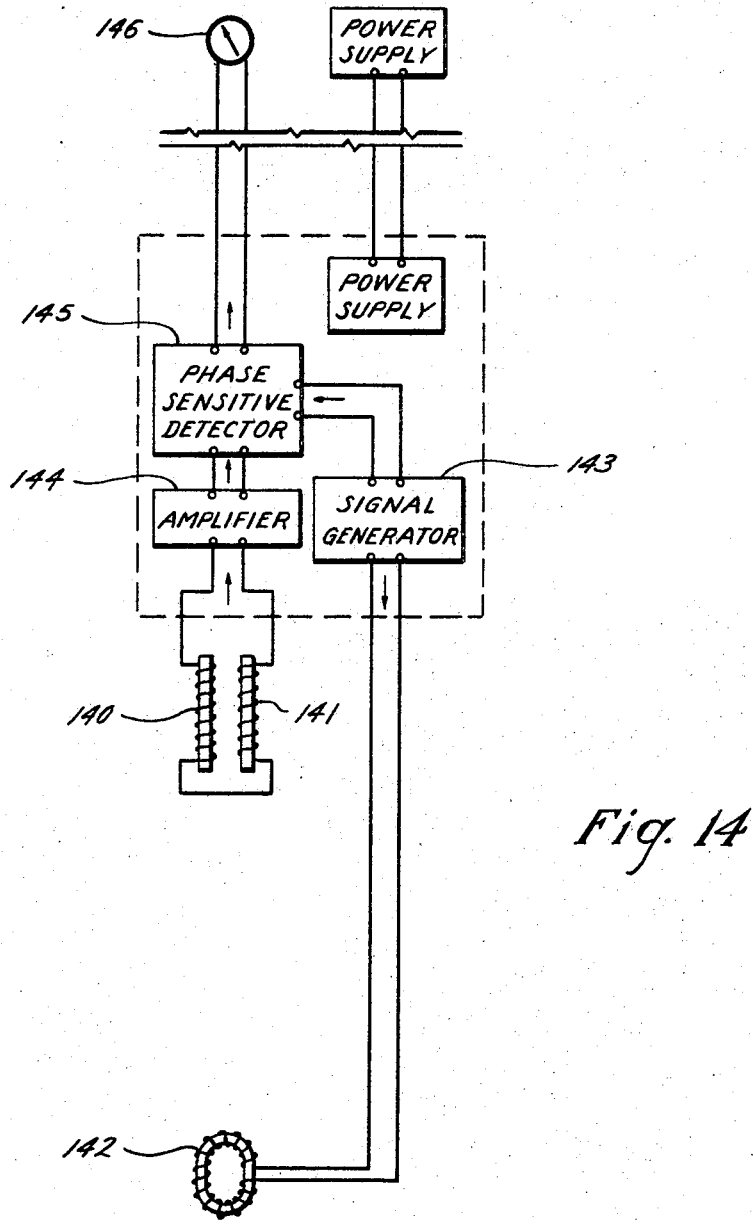

United States Patent Office 3,493,850
Patented Feb. 3, 1970

3,493,850
APPARATUS FOR INVESTIGATING FORMATIONS SURROUNDING A BOREHOLE INCLUDING MEANS FOR GENERATING OPPOSITE POLARITY CURRENT FLOW ON OPPOSITE SIDES OF THE BOREHOLE
Nick A. Schuster, Houston, Tex., assignor, by mesne assignments, to Schlumberger Technology Corporation, Houston, Tex., a corporation of Texas
Filed Jan. 20, 1964, Ser. No. 338, 919
Int. Cl. G01v 3/12
U.S. Cl. 324—6
43 Claims This invention relates to apparatus for investigating subsurface earth formations traversed by a borehole and particularly to such apparatus which measures electrical characteristics of the subsurface earth formations.

In seeking to determine the presence and depth of hydrocarbon-bearing zones (oil, gas, etc.) that may exist in the subsurface earth formations penetrated by a borehole drilled into the earth, various types of exploring devices may be lowered into the borehole for measuring various electrical properties of the earth formations adjacent the borehole. One property that is of particular interest is the original electrical resistivity or conductivity of the subsurface earth formations. After the borehole has been drilled, it is sometimes difficult to determine this original resistivity or conductivity. In permeable formations, for example, fluid filtrate from the drilling mud contained in the borehole invades laterally into the formation. This filtrate invasion alters the electrical resistivity of the portion of the formation immediately adjacent the borehole. Consequently, in order to determine the original or true formation resistivity, it is necessary to look behind any such invaded region and measure the resistivity of a portion of the formation which has not been contaminated by mud filtrate.

In order to provide such a measurement, it is necessary to use an exploring device having a relatively deep lateral investigation characteristic. It is also necessary that the measurement made by such a device not be disturbed to any appreciable extent by the intervening invaded zone. One particularly useful form of apparatus which has been heretofore proposed for this purpose is known as "induction logging" apparatus. Such induction logging apparatus utilizes one or more vertically-spaced transmitter coils for inducing current flow in the adjacent earth formation. The magnitude of this current flow is then determined by means of one or more vertically-spaced receiver coils which are responsive to these earth currents.

While induction logging systems of the type previously proposed provide satisfactory measurements in the majority of cases, formation conditions are sometimes encountered in some geographical localities which reduce the effectiveness and accuracy of such systems, unless rather elaborate precautions are taken. One of these situations is where the drilling mud contained in the borehole is of a highly conductive character. Such drilling muds are sometimes referred to as "salty muds." Such muds are encountered where the borehole has penetrated formations containing rather high concentrations of mineral salts. In these cases, the conductivity of the drilling mud will frequently be equal to or greater than the conductivity of the connate fluid or formation water originally contained in the formation pore spaces. Consequently, the conductivity in the mud-filled borehole will be many times greater than the conductivity of the earth formation.

Another frequently troublesome situation is where the electrical resistivity of the invaded zone is less than the electrical resistivity of the uncontaminated portion of the formation. This condition may arise where the drilling mud or, more precisely, the mud filtrate is more conductive than the connate water contained in the formation pore spaces. This is because filtrate invasion causes the less conductive formation water or other formation fluid to be replaced by more conductive mud filtrate. This situation occurs rather frequently where the drilling mud is relatively "salty." It also occurs for the case of non-salty or "fresh" drilling mud where the connate formation water is also relatively "fresh."

Both of the foregoing situations have the common characteristic that the region nearer the center of the borehole is less resistive than the region farther away from the borehole. A major reason this causes difficulties for previously-proposed types of induction logging systems is because the formation currents induced by such previous systems flow in generally circular loops which are concentric with the borehole. Such current can also flow in the drilling mud contained in the borehole. If the region nearer the center of the borehole is more conductive, then the current flow in this region tends to be more intense (greater current density) than in the more remote regions. This causes the signal induced in the receiver coil of the induction logging system to be determined more predominantly by the region nearer the center of the borehole. This, however, is not the region which it is desired to measure when determining the true or original formation resistivity. Consequently, the accuracy of the measurement is impaired as far as a determination of the original formation resistivity is concerned.

Various methods have been heretofore proposed for minimizing or cancelling out any signal components contributed by the materials closer to the center of the borehole. These methods, however, require a more elaborate form of induction logging system than is sometimes desired. Also, as the conductivities nearer the center of the borehole become higher and higher, it becomes more and more difficult to compensate for these undesired signal components. Irregularities in the size and shape of the borehole also complicate any compensation process.

Another desirable attribute of any borehole logging system is that it have very sharp or very narrow vertical resolution. This provides more detailed information on the nature of the formation parameter in a vertical direction. This attribute is desirable for induction-type logging systems in particular. It has been heretofore found, however, to be rather difficult to provide a relatively narrow vertical resolution for an induction logging system without at the same time reducing its horizontal or lateral depth of investigation. Or, perhaps worse, it has been found that changes in the construction of an induction-type coil system which serve to increase the lateral depth of investigation also serve to decrease or degrade the vertical resolution. This tends to place an upper limit on the maximum lateral depth of investigation which can be utilized.

It is an object of the invention, therefore, to provide new and improved apparatus for measuring the electrical properties of each formations adjacent the borehole.

It is another object of the invention to provide new and improved borehole investigating apparatus having relatively deep lateral investigation characteristics and relatively sharp vertical resolution characteristics.

It is a further object of the invention to provide new and improved induction-type borehole investigating apparatus which provides more accurate measurements where the resistivity of the formation invaded zone is less than the resistivity of the uninvaded portion of the formation.

In accordance with the invention, apparatus for investigating earth formations traversed by a borehole comprises means for producing opposite polarity magnetic flux on opposite sides of the longitudinal axis of the borehole.

This magnetic flux couples with the formations to set up a current flow therein. The apparatus also includes means responsive to at least a portion of this current flow for providing an indication of electrical current flow across the borehole.

For a better understanding of the present invention, together with other and further objects thereof, reference is had to the following description taken in connection with the accompanying drawings, the scope of the invention being pointed out in the appended claims.

Referring to the drawings:

FIG. 1 shows a front view of a representative embodiment of borehole investigating apparatus constructed in accordance with the present invention;

FIG. 2 shows a side view of the FIG. 1 apparatus;

FIG. 3 shows an electrical circuit diagram for the FIG. 1 apparatus;

FIG. 8 shows a second embodiment of borehole apparatus constructed in accordance with the present invention;

FIG. 9 shows a third embodiment of borehole apparatus constructed in accordance with the present invention;

FIG. 10 shows a fourth embodiment of borehole apparatus;

FIGS. 10A and 10B are cross-sectional views of the FIG. 10 apparatus;

FIG. 11 is an electrical circuit diagram for the FIG. 10 aparatus;

FIG. 12 shows a fifth embodiment of borehole apparatus constructed in accordance with the present invention;

FIG. 13 is an electrical circuit diagram for the FIG. 12 apparatus; and

FIG. 14 illustrates a modified electrical circuit system which may be used with any of the first four embodiments.

Figure 4:
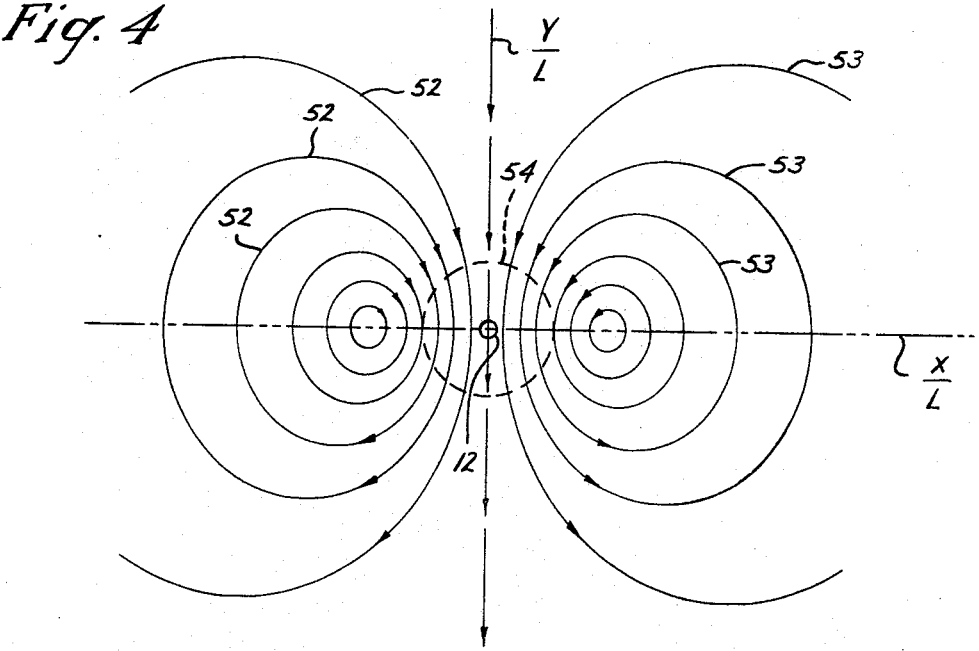
FIGS. 4 and 5 show typical current flow patterns obtained with the FIG. 1 apparatus.

Referring to FIGS. 1 and 2 of the drawings, there is shown apparatus 10 for investigating subsurface earth formations 11 traversed by a borehole 12. The borehole 12 is filled with a conductive drilling fluid or drilling mud 13. FIG. 1 is a front view and FIG. 2 is a side view of the apparatus 10, that is, FIG. 2 is a view taken 90° with respect to the view of FIG. 1. The apparatus 10 includes an elongated, cylindrical support member 14 adapted for movement through the borehole 12. This support member 14 constitutes the lower portion of the apparatus 10. It is made of a non-conductive material such as a synthetic resin or plastic material. A suitable plastic material having the requisite strength is obtained by impregnating a Fiberglas material with epoxy resin. The apparatus 10 also includes a cylindrical fluid-tight housing 15 forming the upper part of the apparatus. The outer surface of housing 15 is either made of or covered with a non-conductive material. The apparatus 10 as a whole is suspended in the borehole 12 by means of an armored multiconductor cable 16.

The apparatus 10 also includes means for producing opposite polarity magnetic flux on opposite sides of the longitudinal axis of the borehole 12. In this embodiment, this means includes afirst induction means for inducing electrical current flow in the earth formations predominately on one side of the borehole 12. This first induction means is formed by a solenoid-type induction coil 17 which is wound around an elongated ferromagnetic core 18. The core 18 may be either a powdered iron core or a laminated iron core. The coil 17 and core 18 are secured to the support member 14 by being mounted within the body of the support member 14. This is indicated by the cross-sectional representation of FIGS. 1 and 2 wherein the outer portion of the housing 14 has been cut away for explanatory purposes in the vicinity of the coil 17 and core 18. The coil 17 and core 18 are positioned on one side of the longitudinal center axis of the support member 14, this center axis being indicated by center line 19. The coil 17 and core 18 are positioned so that the longitudinal axis of the coil 17 is parallel to the longitudinal center axis 19 of the support member 14. Consequently, the longitudinal axis of the coil 17 may also be parallel to the longitudinal center axis of the borehole 12.

The magnetic flux producing means of the present embodiment also includes second induction means for inducing electrical current flow in the earth formations predominately on the opposite side of the borehole 12. This second induction means is formed by a second solenoid-type induction coil 20 which is wound around a second ferromagnetic core 21. The coil 20 and core 21 are also secured to the support member 14 by being mounted within the interior thereof. The coil 20 and core 21 are positioned to one side of the longitudinal center axis 19 of the supported member 14 with the longitudinal axis of the coil 20 parallel to the longitudinal axis 19 of the support member.

As seen in FIG. 1, coils 17 and 20 are positioned in a side-by-side manner with their longitudinal axes parallel to one another. In the side view of FIG. 2, only the coil 20 can be seen since the coil 17 is located directly therebehind in this view. Coil 20 is constructed as exactly like coil 17 as is possible, each coil having the same number of turns, etc., so that their electromagnetic fields will be of equal strength.

The apparatus 10 also includes at least one current detecting means secured to the support member 14 and longitudinally spaced apart from the induction coils 17 and 20. In the present embodiment, a first such current detecting means is represented by a toroidal coil 22 wound around a toroidal core 23 made of ferromagnetic material. This toroidal coil 22 is located at the lower end of the support member 14 and, for purposes of explanation, this portion of the support member 14 is shown in a cut-away cross-sectional manner. As best seen in FIG. 2, a lateral passageway 24 is provided at the lower end of support member 14. This lateral passageway 24 extends laterally through the support member 14 from one side thereof to the other. Consequently, when support member 14 is in the borehole 12, the passageway 24 will be filled with drilling mud 13. This passageway 24 is aligned relative to the induction coils 17 and 20 such that the longitudinal center axis 25 of this passageway 24 is perpendicular to the plane defined by the longitudinal axes of the coils 17 and 20. The toroidal coil 22 and torodial core 23 are secured to the support member 14 by being mounted within the interior thereof. More particularly, the coil 22 and core 23 are located in the center of the support member 14 and are positioned to encircle the lateral passageway 24.

The support member 14 is provided with additional lateral passageways 26–32 similar to the passageway 24, these additional passageways being vertically spaced along the lower portion of support member 14. In the present embodiment, a second current detecting means is associated with the upper lateral passageway 31. This second current detecting means comprises a toroidal coil 33 having a toroidal core 34 which encircles the lateral passageway 31.

Referring now to FIG. 3 of the drawings, there is shown in a schematic manner an electrical circuit diagram for the apparatus of FIG. 1. The circuits contained within dashline box 15 of FIG. 3 are included within the fluid-tight housing 15 forming the upper part of the borehole apparatus 10 of FIG. 1. Conductors 16a–16f are individual insulated conductors contained within the armored cable 16 of FIG. 1.

As seen in FIG. 3, the present borehole investigating apparatus includes circuit means for energizing the two side-by-side induction coils 17 and 20 in an opposite polarity manner. This circuit means includes as signal generator 40 and conductors 41, 42 and 43 which serve to connect the two induction coils 17 and 20 in series across the output terminals of the signal generator 40. Signal generator 40 produces an alternating-current output current of constant peak amplitude and constant frequency. Since, in the present embodiment, coils 17 and 20 are wound in the same direction, conductors 41, 42 and 43 are connected to pass the signal generator current in one direction through the coil 17 and in the opposite direction through the coil 20. Consequently, the electromagnetic flux fields, developed by the two coils 17 and 20 will, at any given instant, be in opposite directions to one another. If, for example, electromagnetic flux is passing in a downwardly direction through the core 18 of coil 17, then, at the same instant, the electromagnetic flux in the core 21 of coil 20 will be passing in an upwardly direction. Thus, the polarity of the two coils 17 and 20 are opposite to one another.

As shown in FIG. 3, the present borehole investigating apparatus also includes means for providing separate indications individually representative of any currents detected by the two current detecting coils 22 and 33. For the lower current detecting coil 22, this includes an amplifier 44, a phase sensitive detector 45 and an indicating or recording device 46, the device 46 being located at the surface of the earth. A phase reference signal from the signal generator 40 is also supplied to the phase sensitive detector 45. This phase reference signal has the same phase timing as the current supplied to induction coils 17 and 20. The indication providing means for the upper current detecting coil 33, on the other hand, includes an amplifier 47, a phase sensitive detector 48 and an indicating or recording device 49 the device 49 being located at the surface of the earth. A phase reference from the signal generator 40 is also supplied to the phase sensitive detector 48. This phase reference signal is also "in phase" (either 0° or 180°) with the current supplied to induction coils 17 and 20.

A power supply system including a power supply unit 50 located at the surface of the earth and a cooperating power supply unit 51 located in the downhole portion of the apparatus is used to provide the necessary electrical energy for the operation of the downhole electrical circuits shown in FIG. 3.

Considering now the operation of the apparatus thus far described, the downhole apparatus 10 is lowered into the borehole 12 and the signal generator 40 is activated to energize the induction coils 17 and 20 with alternating current of constant peak amplitude and constant frequency. Consequently, induction coil 17 generates an electromagnetic flux field which penetrates the adjacent earth formations on one side of the borehole 12 and the induction coil 20 generates a second electromagnetic flux field which penetrates the earth formations on the other side of borehole 12. These flux fields are of equal strength. The directions of the flux lines as they pass through the cores 18 and 21 are, at any given instant, in opposite directions to one another. Since the pore spaces in the adjacent earth formations generally contain at least some conductive formation fluid, such as formation water of a more or less salty character, these alternating electromagnetic flux fields serve to induce electrical current flow in the adjacent earth formations.

A typical current flow pattern obtained at the level of the lower current detecting coil 22 is indicated in FIG. 4 of the drawings. FIG. 4 represents a horizontal cross-section of the earth formation taken along the section line 4—4 of FIG. 1. The borehole 12 is indicated by the small circle at the center of FIG. 4. For FIG. 4, it is assumed that the spacing L between the vertical midpoint for induction coils 17 and 20 and the vertical midpoint for current detecting coil 22 is equal to 100 inches. In FIG. 4, the induction coils 17 and 20 are located on the $X/L$ axis within the confines of borehole 12. Because of the small scale, coils 17 and 20 are not shown in FIG. 4. Current flow lines 52 of FIG. 4, located on the lefthand side of borehole 12, are induced by induction coil 17 while current flow lines 53, located on the righthand side of borehole 12, are induced by induction coil 20. As seen from FIG. 4, both sets of current flow lines 52 and 53 are in the same direction and very nearly parallel to one another in the vicinity of the borehole 12. The arrow heads indicate the direction of current flow for one half of the alternating current cycle, the arrow heads being reversed during the other half cycle. Dashline 54 represents the outer perimeter of a typical invaded zone that might be encountered. In the present example, dashline 54 represents an invasion diameter of 80 inches.

As seen from FIG. 4, the net effect of the combined electromagnetic flux fields produced by induction coils 17 and 20 is to cause generally-parallel horizontal lines of current to flow across the borehole 12. For the most part, the current lines which cross the borehole proper represent current lines which originate in formation regions which are relatively far removed from the borehole 12. In other words, the current lines which cross the borehole 12 travel for the most part through relatively remote formation regions which are relatively far removed from the borehole 12. This provides a highly desirable deep lateral investigation characteristic for the apparatus.

Consequently, by measuring a sample of the horizontal current crossing the borehole 12, an indication can be provided of the electrical resistivity of formation regions which are rather far removed from the borehole 12. This current measurement is provided by the current detecting coil 22 located at the lower end of the apparatus 10. In particular, the lateral passageway 24 through the support member 14 is aligned so that the curent flow across the borehole 12 passes through this passageway 24 with the current lines parallel to the horizontal center axis 25 of the passageway 24. In other words, the center axis 25 lies along the $Y/L$ axis of the FIG. 4 graph. The current detecting coil 22 then serves to measure the current density in the lateral pasageway 24, the ferromagnetic core 23 serving to augment the sensitivity of this current measuring system.

The mathematics for the system thus far described can be derived from the mathematical theory for a magnetic dipole source. Since each of the induction coils 17 and 20 behaves like a magnetic dipole, it can be shown that, to a good approximation, the electric field intensity produced within and immediately adjacent the borehole 12 at any given vertical level therein is described by the mathematical expression:

$$E=\frac{\mu \omega r N_T A_T I_T}{4\pi L^3} \quad (1)$$

where:

$E$=peak value of the electric field intensity
$\mu$=permeability of earth formations
$\omega$=angular frequency ($2\pi f$) of alternating current supplied to induction coils
$s=$ spacing between center axes of induction coils
$N_T$=number of turns on each of the induction coils
$A_T$=cross-sectional area of each of the induction coils
$I_T$=peak amplitude of the alternating current supplied to the induction coils
$L$=longitudinal (vertical) spacing between induction coil midpoint and the level being considered (midpoint of current detecting coil).

The direction of the electric field lines is indicated by the current flow lines of FIG. 4 since the electric field pattern is identical to the current flow pattern. In obtaining this expression for the electric field intensity, it was assumed that the spacing $s$ between the induction coils is small compared to the longitudinal spacing L and also that the field intensity points being considered are located in or near the borehole at a distance from the center axis thereof which is small compared to the longitudinal spacing I. It was also assumed that no appreciable skin effect phenomena occurs.

Assuming for the moment that the conductivity of the drilling mud contained in the borehole is approximately the same as the conductivity of the earth formation, then the density of current flow across the borehole is described by the mathematical expression:

$$J = E\sigma_t \tag{2}$$

where:

J = peak value of current density
$\sigma_t$ = conductivity of the earth formation.

This form of expression for the current density is exactly correct only for the homogeneous case, that is, for the case where the entire region being considered has the same value of conductivity. It is, however, helpful for explanatory purposes and will be used for the present moment.

The total amount of current passing through the lateral passageway 24, and hence through the center hole of the toroidal current detecting coil 22 is described by the expression:

$$I = JA_H \tag{3}$$

I = peak value of total current through lateral passageway
$A_H$ = cross-sectional area of lateral passageway.

The resultant voltage developed across the output terminals of the current detecting coil 22 is described for $\mu_R$ not too large by the mathematical expression:

$$V = \frac{2\omega \mu_R N_R A_R}{R} \cdot I \cdot 10^{-9} \tag{4}$$

V = peak voltage across current detecting coil
$\omega$ = angular frequency of the alternating current
$\mu_R$ = permeability of the toroidal core
$N_R$ = number of turns on current detecting coil
$A_R$ = cross-sectional area of the toroidal core
R = mean radius of revolution for the toroid.

This is an approximate solution for the toroid which assumes that the magnetic field intensity is uniform across the cross-section of the toroidal core and equal in value to the magnetic field intensity at a radius corresponding to the radius of revolution of the toroid. Thus, it is completely accurate only for toroidal cores of relatively small cross-sectional area. It is sufficient for present purposes, however, since any modifications required to take into account the precise geometry of the toroidal core will relate to factors which are constant for any given geometry.

Combining Equations 1 through 4 and representing all of the constant terms by a single constant K gives the following relationship for the detecting coil voltage:

$$V = K\sigma_t \tag{5}$$

Equation 5 shows that the peak value of the alternating-current voltage appearing across the output terminals of the current detecting coil 22 is directly proportional to the electrical conductivity of the earth formation at the level of the current detecting coil 22. This alternating-current voltage is "in phase" with the alternating current supplied to the two induction coils 17 and 20 by the signal generator 40. Note: "in phase" means either a 0° or a 180° phase relationship since which is which depends on which output terminal of the current detecting coil 22 is used as the point of reference.

The alternating-current voltage developed across the current detecting coil 22 is supplied by way of the amplifier 44 to the phase sensitive detector 45. An "in phase" phase reference signal from the signal generator 40 is also supplied to the phase sensitive detector 45. Consequently, there appears at the output of phase sensitive detector 45 a direct-current signal having a magnitude which is proportional to the peak amplitude of the voltage developed across the current detecting coil 22. This direct-current signal is then supplied to a recording device 46 located at the surface of the earth to provide an indication which is proportional to the conductivity of the earth formation material at the level of the current detecting coil 22.

Figure 5:
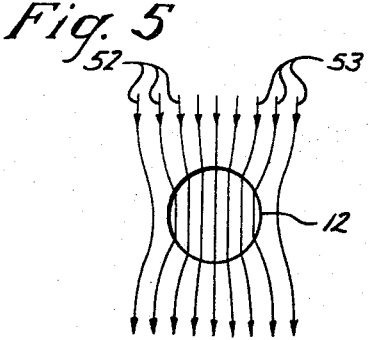

Up to this point, it has been assumed that the conditions encountered by the induced current flow lines are of a homogeneous nature and, in particular, that the conductivity of the drilling mud contained within the borehole 12 is the same as the conductivity of the surrounding earth formation. In practice, the conductivity of the drilling mud will usually be different from that of the earth formation. The effect of this departure from a homogeneous condition is indicated in FIG. 5 of the drawings for the case where the drilling mud is more conductive than the surrounding earth formation. As there indicated, the presence of a conductive borehole distorts the current flow lines so as to increase the current density in the more conductive borehole. Consequently, the recorded value of conductivity obtained from measuring the current flow across the borehole will be higher than the actual conductivity of the earth formation. To take this into account, Equation 5 may be rewritten as:

$$V = K\sigma_a \tag{6}$$

where $\sigma_a$ is the apparent conductivity recorded on the recording device 46.

The relationship between this apparent conductivity and the conductivities of the earth formation and the drilling mud is described by the mathematical expression:

$$\sigma_a = \frac{2\sigma_t}{1 + \dfrac{\sigma_t}{\sigma_m}} \tag{7}$$

$\sigma_a$ = apparent conductivity
$\sigma_t$ = conductivity of the earth formation
$\sigma_m$ = conductivity of the drilling mud.

This takes into account the change in current density caused by any difference in the conductivities of the earth formation and the drilling mud.

In many cases, the conductivity of the drilling mud will be considerably greater than the conductivity of the earth formation. When this condition prevails, the second term in the denominator of Equation 7 becomes relatively insignificant and Equation 7 may be rewritten as:

$$\sigma_a = 2\sigma_t \tag{8}$$

Thus, for a large number of cases, the apparent conductivity is equal to twice the true conductivity of the earth formation. This factor of "two" can be included in the calibration constant or scale constant of the system and, hence, the indicating device 46 can be calibrated directly in terms of the true formation conductivity $\sigma_t$. In many geographical localities, this will provide $\sigma_t$ values having the requisite degree of accuracy since $\sigma_m$ will always be much larger than $\sigma_t$ in these localities.

Figure 6:
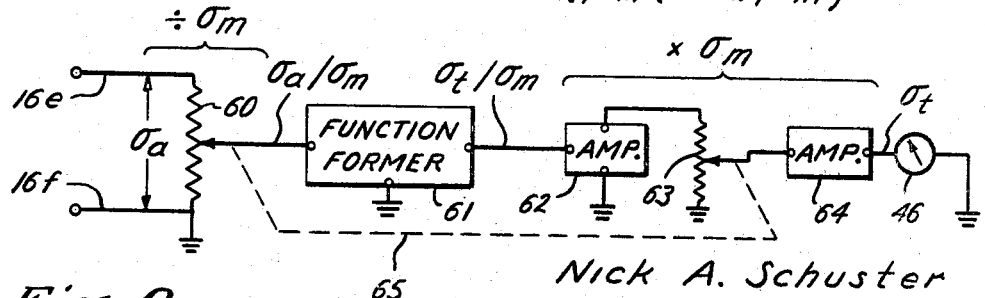
FIG. 6 shows a modified form of recording system that may be used with the FIG. 1 apparatus.

If a more precise determination of $\sigma_t$ is desired, particularly for those cases where the difference between $\sigma_t$ and $\sigma_m$ is not too great, then the signal processing apparatus of FIG. 6 may be utilized. This apparatus is located at the surface of the earth just ahead of the indicating or recording device 46. It serves to determine the exact value of $\sigma_t$ by solving Equation 7 for $\sigma_t$, $\sigma_a$ being the measured signal value and $\sigma_m$ being determined from measurements made on a sample of the drilling mud.

Figure 7:
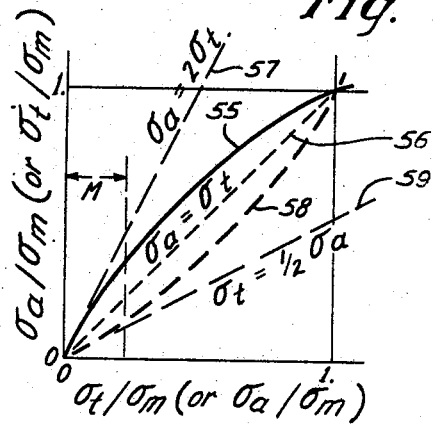
FIG. 7 is a graph used in explaining the recording system of FIG. 6.

The graph of FIG. 7 shows in a graphical manner the various relationships which are involved. Assuming first that the abscissa values of FIG. 7 are in terms of $\sigma_t/\sigma_m$ and the ordinate values are in terms of $\sigma_a/\sigma_m$, then curve 55 represents the relationship between $\sigma_t$ and $\sigma_a$ as defined by Equation 7, both sides of Equation 7 being divided by $\sigma_m$ for normalization purposes. Dashline 56 of FIG. 7 represents the ideal relationship where $\sigma_a$ is always equal to $\sigma_t$. Dashline 57 of FIG. 7 represents the straight line relationship which would exist between $\sigma_t$ and $\sigma_a$ if $\sigma_a$ were always equal to twice $\sigma_t$. A comparison of curves 55 and 57 shows that the assumption that $\sigma_a$ is twice $\sigma_t$ is quite accurate for small values of $\sigma_t/\sigma_m$. In fact, fairly good accuracy can be obtained with this assumption over the range M of FIG. 7, which represents the maximum range of $\sigma_t/\sigma_m$ values usually encountered for the case of salty drilling muds.

For the signal processing apparatus of FIG. 6, both sides of Equation 7 are divided by $\sigma_m$ and Equation 7 solved for the quantity $\sigma_t/\sigma_m$. This gives:

$$\frac{\sigma_t}{\sigma_m} = \frac{\frac{\sigma_a}{\sigma_m}}{2 - \frac{\sigma_a}{\sigma_m}} \qquad (9)$$

Equation 9 is plotted on the FIG. 7 graph as dashline curve 58. For curve 58, the abscissa values of FIG. 7 are in terms of $\sigma_a/\sigma_m$ while the ordinate values are in terms of $\sigma_t/\sigma_m$. Note that curve 58 is the mirror image of curve 55 taken with respect to the unity slope line 56. Dashline 59 (slope=½) corresponds to the correction that would be required if $\sigma_a$ were always equal to twice $\sigma_t$.

Considering the FIG. 6 apparatus in detail, the apparent conductivity signal $\sigma_a$ sent up cable conductors 16e and 16f is applied to a voltage divider 60. The sliding tap on voltage divider 60 is adjusted to divide the $\sigma_a$ signal by a factor corresponding to $\sigma_m$. The normalized $\sigma_a/\sigma_m$ signal is then supplied to a function former 61. Function former 61 is constructed to provide an input-output signal transfer characteristic as described by Equation 9 and represented by curve 58 of FIG. 7. This signal transfer characteristic is of a nonlinear nature and serves to reduce the $\sigma_a/\sigma_m$ signal by the appropriate amount to provide an output signal corresponding to $\sigma_t/\sigma_m$. This $\sigma_t/\sigma_m$ signal is then supplied by way of an amplifier 62, a voltage divider 63 and an amplifier 64 to the indicating device 46. The overall signal gain of units 62, 63 and 64 is adjusted by means of the voltage divider 63 so as to multiply the $\sigma_t/\sigma_m$ signal from function former 61 by a factor corresponding to $\sigma_m$. Consequently, the final signal supplied to the indicating device 46 is proportional to $\sigma_t$ alone. As indicated by dashline linkage 65 of FIG. 6, the sliding contacts on voltage dividers 60 and 63 may be ganged together and controlled by a single control knob. This control knob may be provided with a calibrated scale calibrated in terms of $\sigma_m$. With the apparatus of FIG. 6, precise determinations of the true formation conductivity $\sigma_t$ can be made over a rather considerable range of $\sigma_t$ to $\sigma_m$ values.

As indicated in FIGS. 1–3, the borehole investigating apparatus of the present embodiment includes a second current detecting means represented by the current detecting coil 33 and toroidal core 34 associated with the lateral passageway 31. Since this current detecting coil 33 is closer to the induction coils 17 and 20, a greater proportion of the current flowing through the lateral passageway for this coil comes from formation regions which are closer to the borehole than was the case for the first current detecting coil 22. This may be seen by considering FIG. 4. The abscissa and ordinate axes of FIG. 4 are in terms of $X/L$ and $Y/L$ where L is the vertical spacing between the induction coils and the current detecting coil. Consequently, for a given borehole diameter, the size of the borehole as depicted on FIG. 4 increases as the value of the vertical spacing factor L decreases. In other words, the horizontal current flow pattern is of the same general shape at different vertical distances from the induction coils 17 and 20 except that the absolute size of the current flow pattern as a whole decreases as the vertical location being considered moves closer to the induction coils 17 and 20.

With respect to a given current flow pattern, such as shown in FIG. 4, this is easier to visualize by considering that the relative size of the borehole increases as the vertical distance from the induction coils 17 and 20 decreases. Thus, for example, dashline circle 54 of FIG. 4 could be used to represent the relative size of the borehole at the level of the upper current detecting coil 33. In this case, it is seen that more of the current flow lines crossing the borehole complete their journeys through formation regions which are closer to the borehole. In effect, this means that a current detecting device located at this upper level will provide a signal corresponding to a shallower lateral depth of investigation into the adjacent earth formation. Thus, the signal from the second current detecting coil 33 is determined predominantly by formation material which is closer to the borehole than is the case for the signal produced by the first current detecting coil 22. Consequently, increasing the vertical spacing factor L increases the effective lateral depth of investigation and, conversely, decreasing this spacing factor decreases the lateral depth of investigation for the system.

The shallow investigation signal from the second current detecting coil 33 is supplied by way of the amplifier 47 to the second phase sensitive detector 48. An "in phase" phase reference signal from the signal generator 40 is also supplied to the phase sensitive detector 48. Consequently, there is produced at the output of the phase sensitive detector 48 a direct-current signal having a magnitude which is proportional to the peak amplitude of the shallow investigation alternating-current signal developed across the second current detecting coil 33. This direct-current signal is supplied by way of cable conductors 16a and 16b to the second indicating device 49 located at the surface of the earth.

Equations 1 through 9 given above also apply to the shallow investigation system formed by the second current detecting coil 33, provided that the appropriate value for the spacing factor L is used and provided that L is not too small. The increase in current density in the borehole due to the presence therein of conductive drilling mud also occurs for the case of the second current detecting coil 33. Consequently, where necessary, apparatus corresponding to that of FIG. 6 may also be used with the shallow investigation indicating device 49.

Preferably, each of the current detecting coils 22 and 33 is constructed so as not to introduce any appreciable electrical impedance to the flow of current through the center passageway of its toroidal core. This can be accomplished by any construction which minimizes the "primary impedance" of the current path through the center of the core. One technique that may be used is to provide an auxiliary winding on each toroidal core and then to provide negative feedback to this auxiliary winding in such a way as to operate the toroidal core near its zero flux point. For example, the main current detecting coil can feed into a high impedance input of an amplifier and the output of the amplifier supplied back to the auxiliary winding in a negative feedback manner so as to produce an approximately equal and opposite magnetomotive force in the toroidal core. Consequently, the current flowing through the center passageway of the toroidal core would encounter no additional resistive or reactive component of impedance other than the natural resistivity of the drilling mud itself.

As is indicated by the current flow pattern of FIG. 4, the present borehole investigating apparatus is capable of providing a very deep lateral or horizontal depth of investigation into the earth formations adjacent the borehole. Also, since the vertical resolution of the system is defined by the vertical dimension of the lateral passageway through the current detecting coil, this apparatus inherently provides a very sharp vertical resolution characteristic. This vertical resolution characteristic is not dependent on the spacing between the induction coils and the current detecting coil. Consequently, the vertical resolution is not dependent on the lateral depth of investigation and very deep lateral depths of investigation can be provided without impairing the vertical resolution. The final limit on the maximum depth of lateral investigation is determined primarily by the signal-to-noise ratio of the system.

Another advantage of the present borehole investigating apparatus is that the presence of a low resistivity invaded zone surrounding the borehole will not appreciably disturb the measurement of the true resistivity of the univaded portion of the formation. This is because the current flow pattern is of such a nature as to put the invaded zone resistance in series with the uninvaded zone resistance. If, therefore, the invaded zone resistance is relatively low compared to the resistance of the uninvaded zone, the total series resistance will be determined primarily by the uninvaded zone, which is the desired result. The same thing applies for the case of a low resistance drilling mud in the borehole 12. Since the drilling mud in the borehole is also in series in any given current flow path, the lower the resistance of the drilling mud the less effect it has on the magnitude of the current passing therethrough. Consequently, the apparatus of the present invention is particularly advantageous in those geographical locations where the drilling mud contained in the borehole tends to be of a highly conductive or highly "salty" character.

It is noted, of course, that a low resistance drilling mud produces an increase in current density in the manner described in connection with Equation 7 above. This is a form of focusing or lens-type action produced by the resistivity contrast. As indicated in connection with Equations 7 and 8, the lower the drilling mud resistivity (higher $\sigma_m$), the more nearly constant is this focussing effect. In the limit, when the drilling mud resistivity becomes much less than the adjacent formation resistivity, the current density in the borehole is increased by a constant factor of "two." Consequently, the fact remains that the lower the resistivity of the drilling mud, the less effect the drilling mud has on the overall measurement.

The foregoing remarks about the presence of an invaded zone not affecting the measurements are for the case of deep lateral measurements made with a current detecting coil which is spaced a relatively large distance apart from the induction coils. The nearer the current detecting coil is located to induction coils, the greater the influence of the invaded zone since the greater is the proportion of the total length of current flow which occurs in the invaded zone. This does not reduce the usefulness of the results. It merely changes the character of the results. Instead of measuring uninvaded zone resistivity, you are measuring invaded zone resistivity. Consequently, by simultaneously making two or more measurements with two or more current detecting coils spaced at different distances from the induction coils, it is possible to make a complete determination of the lateral dimensions and resistivities of the different regions surrounding the borehole. By using multiple current detecting coils, it is possible, for example, to determine the resistivity of the invaded zone, the diameter of the invaded zone and the resistivity of the uninvaded zone, assuming, of course, that these different zones exist in the formation being measured.

Referring now to FIG. 8 of the drawings, there is shown a further embodiment of borehole investigating apparatus constructed in accordance with the present invention. This embodiment includes a downhole apparatus or instrument 70 having an elongated non-conductive support member 71 and a fluid-tight housing 72. A pair of side-by-side induction coils is located near the upper end of the support member 71, only one of these coils, namely, coil 73, being visible in this particular view. These induction coils are constructed in the same manner as described in connection with the embodiment of FIGS. 1 and 2. In the present FIG. 8 embodiment, the current detecting means are mounted on wall engaging pad members. In particular, a deep investigation system is provided by using a first pair of pad members 74 and 75 located toward the lower end of the support member 71. These pad members are constructed of a non-conductive material such as rubber. Each of the pad members 74 and 75 is coupled to the support member 71 by means of bowed spring members 76 and 77, respectively. Bowed spring members 76 and 77 are adapted to urge the pad members 74 and 75 outwardly against the wall of the borehole 12. A first current detecting means represented by a toroidal coil 78 is embedded within the pad member 74, while a second current detecting means represented by a toroidal coil 79 is embedded within the other pad member 75. Current flow passageways 80 and 81 are provided through the centers of the pad members 74 and 75. A cooperating current flow passageway 82 extends through the support member 71 in alignment with the pad member passageways 80 and 81.

A shallow investigation system is also provided, this system being provided by a pair of current detecting means associated with a second pair of wall engaging pad members 84 and 85 which are longitudinally spaced at a lesser distance from the induction coils, the location of which is indicated by induction coil 73. In particular, a toroidal coil 86 is embedded in pad member 84 while a toroidal coil 87 is embedded in pad member 85.

The circuits for operating the coil system shown in FIG. 8 may be the same as those shown in FIG. 3. In the case of FIG. 8, the two current detecting coils located at the same level, such as the deep investigation coils 78 and 79, are connected in a series aiding manner to the input terminals of an amplifier located within the fluid-tight housing 72. Similarly, the two current detecting coils 86 and 87, which provide a shallow investigation signal, are connected in a series aiding manner to the input terminals of a second amplifier in the housing 72. The remainder of the circuits within the housing 72 may be the same as shown in FIG. 3.

The apparatus of FIG. 8 operates in much the same manner as did the apparatus of FIG. 1. The two side-by-side induction coils, positioned as indicated by induction coil 73, induce electrical current flow in the adjacent earth formations. This current flow crosses the borehole in a parallel horizontal manner. The horizontal current flow at the level of the lower pad members 74 and 75 is detected by the current detecting coils 78 and 79 to provide a deep investigation conductivity signal. The horizontal current flow at the level of the upper pad members 84 and 85, on the other hand, is detected by coils 86 and 87 to provide a shallow investigation conductivity signal.

The use of current detecting coils which are pressed against the wall of the borehole, as indicated in FIG. 8, offers certain advantages for some formation situations. Consider, for example, the case of a very thin conductive earth bed sandwiched between a pair of more resistive earth beds. A high current density will be induced in the thin conductive bed, but practically no current will flow in the thicker side beds. When this high current density from the conductive bed arrives at the borehole, it will tend to spread out in a vertical direction in order to cross the borehole with a bigger cross-sectional area. This will tend to reduce the effective current density in the borehole. If, however, the current measuring coils are pressed against the wall of the borehole, this high current density will be measured as it enters the borehole and before it has had a chance to spread out by any appreciable amount. Thus, the use of wall engaging current detecting coils is advantageous in the case of very thin earth beds such as those having a vertical thickness of less than about three feet.

Referring now to FIG. 9 of the drawings, there is shown another embodiment of borehole apparatus constructed in accordance with the present invention. This apparatus includes a downhole apparatus 90 having a coil system support member 91. The coil system of this embodiment is constructed to provide deeper lateral investigation for a given overall coil system length. This objective is achieved by using a second pair of side-by-side induction coils 92 and 93 located below a first pair of side-by-side induction coils 94 and 95. Induction coil 92 is mounted within the support member 91 directly below and in axial alignment with the upper induction coil 94. Similarly, the induction coil 93 is mounted within the support member 91 directly below and in axial alignment with the upper induction coil 95. The two lower induction coils 92 and 93 are constructed to provide electromagnetic fields of equal strength to one another. They are polarized, however, to provide fields which are of opposite polarity to one another at any given instant. The strength of the flux field produced by the lower coil 92 is, however, made smaller than the strength of the flux field developed by the coil 94 located directly thereabove. Also, these two coils 92 and 94 are polarized relative to one another so that their flux fields are of opposite polarity at any given instant. Similarly, the field strength for the lower coil 93 is made to be less than that for the upper coil 95 and the coils 93 and 95 are operated in an opposite polarity manner with respect to one another. If the number of turns on coils 92 and 93 are less than those on coils 94 and 95, the desired operation can be obtained by the appropriate series interconnection of all four induction coils, the energizing current being supplied in series thereto by an appropriate signal generator located within the fluid-tight housing at the upper end of the apparatus 90. For the present embodiment, only a single current detecting coil 96 is indicated. This coil 96 may be of the toroidal type previously considered.

The use of two pairs of induction coils as shown in FIG. 9 serves to provide a form of focussing action whereby current flow lines which flow principally through a predetermined formation region may be cancelled or minimized. To this end, the upper pair of induction coils 94 and 95 induce both shallow and deep current flow in the adjacent earth formation at the level of current detecting coil 96. The lower pair of induction coils 92 and 93, on the other hand, induces at the level of current detecting coil 96 a current flow which is more predominantly of a shallow nature. This is because the lower induction coils 92 and 93 are closer to the current detecting coil 96. The lower induction coils 92 and 93 being of opposite polarity to the upper induction coils 94 and 95, the shallow investigation currents induced by the two pairs of induction coils tend to cancel one another, either in whole or in part. As a result, a greater fraction of the total current measured by the current detecting coil 96 is contributed by the formations regions which are more remote from the borehole. In effect, the lateral depth of investigation of the system is increased. Also, more accurate indications of the true resistivity of the uninvaded portion of the formations is provided. If desired, additional pairs of induction coils can be used to provide further focussing action.

Instead of using multiple pairs of induction coils to provide deeper lateral investigation for a given overall coil system length, this technique can be used to provide the same lateral depth of investigation with a coil system having a shorter overall length. As the spacing between the induction coils and the current detecting coil becomes shorter, however, an additional problem will be encountered. In particular, each pair of induction coils will tend to generate some vertical current flow components in the immediate vicinity thereof, especially within the conductive drilling mud 13 contained within the borehole 12. This effect will die out fairly rapidly as the distance from the induction coils is increased. It may, however, give problems where it is desired to place a current detecting coil relatively close to a pair of induction coils. If the current detecting coil is located relatively close to a pair of induction coils, some of these vertical current flow components will tend to flow down one side of the borehole, cross through the current detecting coil and flow back up the other side of the borehole. This will introduce an erroneous component into the output signal provided by the current detecting coil.

Fortunately, where two or more pairs of induction coils are used, any undesired vertical current components can be considerably minimized by the proper construction and location of the different coil pairs relative to one another. Considering, for example, the two pair case of FIG. 9, since the second pair of induction coils is of opposite polarity to the first pair, their respective vertical current components will tend to oppose one another. Various ways of taking advantage of this opposing effect are possible. One way is to choose the number of turns on the coils of the second pair so that the net magnetic field in the immediate vicinity of the current detecting coil is equal to zero. This will help minimize the vertical current flow. If more than two pairs of induction coils are used, then additional points of zero magnetic field may be established at additional locations along the coil system.

If a further reduction in any vertical current flow components is desired, then suitable current blocking means can be secured to the support member 91 in the vicinity of the induction coils. One form of such current blocking means is indicated in FIG. 9 by a pair of vertical non-conductive fin members 98 which are secured to the support member 91 and individually extend radially outward from the body of the support member 91. These fin members 98 are constructed of a flexible non-conductive material such as rubber. A cross-sectional view of the fin members 98 relative to the cross-section of the borehole 12 is shown in FIG. 9A. The purpose of these fin members 98 is to prevent, for example, any vertical current flow up the back side of the borehole 12 from crossing over and flowing back down the front side of the borehole. In other words, vertically-extending current loops are prevented from occurring in the drilling mud 13 by blocking the necessary current cross-over region at one end of the loops.

Referring now to FIGS. 10 and 11 of the drawings, there is shown a further embodiment of borehole investigating apparatus constructed in accordance with the present invention. This embodiment includes a downhole apparatus or instrument 100 having an elongated non-conductive support member 101 and a fluid-tight housing 102. Mounted within the support member 101 is a pair of side-by-side induction coils 103 and 104 for producing equal and opposite magnetic fields on their respective sides of the borehole 12. Also mounted within the support member 101 near the lower end therof is a toroidal-type current detecting coil 105. A lateral passageway 105a through the support member 101 passes through the center hole of toroidal coil 105. As seen in FIG. 11, coil 105 is provided with a toroidal core 106 which is made of ferromagnetic material. The appaartus of FIG. 10 further includes a second current detecting means secured to the support member 101 for detecting any longitudinal current flow in the borehole 12. This second current detecting means includes a first semi-toroidal coil 107 mounted within the support member 101 immediately above the main toroidal coil 105. A cross-sectional view of this semi-toroidal coil 107, looking down from above, is shown in FIG. 10B. As there seen, this coil includes a ferromagnetic core 108 which is curved to form part of a toroid. The coil winding 107 is wound around the core 108. This can perhaps be better seen in the perspective view of FIG. 11. The second current detecting means of the present embodiment also includes a second semi-toroidal coil 109 which is mounted within the support member 101 immediately below the main toroidal coil 105. As seen in FIG. 11, this second semi-toroidal coil 109 is provided with a semi-toroidal core 110 of ferromagnetic material.

The apparatus 100 also includes non-conductive current blocking means secured to the support member 101 in the vicinity of the induction coils 103 and 104. This current blocking means includes a first pair of non-conductive fin members 112 which are mounted immediately below the induction coils 103 and 104 and a second pair of non-conductive fin members 113 mounted immediately above the induction coils 103 and 104. A cross-sectional view of the fin members 112 is shown in FIG. 10A. These fin members are constructed of a flexible non-conductive material, such as rubber, and extend radially outward from the body of the support member 101 a distance corresponding to the nominal diameter of the borehole 12.

The electrical circuits for operating the induction and current detecting coils of FIG. 10 are shown in FIG. 11. FIG. 11 also shows a perspective view of the various coils, the support member 101 being omitted for sake of simplicity. As seen in FIG. 11, the induction coils 103 and 104 are connected in series across the output terminals of a signal generator 114. Signal generator 114 serves to energize the induction coils 103 and 104 with alternating current of constant peak amplitude and constant frequency. The three current detecting coils 105, 107 and 109 are connected in series with one another and with the input terminals of an amplifier 115. The output of amplifier 115 is connected to a phase sensitive detector 116 which also receives a phase reference signal from the signal generator 114. The output of phase sensitive detector 116 is in turn connected to an indicating device 117 located at the surface of the earth.

Considering the operation of the apparatus shown in FIGS. 10 and 11, the induction coils 103 and 104 are energized to produce equal and opposite magnetic flux fields on the two sides of the borehole 12. As previously indicated in connection with the FIG. 1 embodiment, this serves to induce a horizontal flow of electrical current across the borehole 12 at the level of the main current detecting coil 105. Coil 105 is positioned to detect and measure the magnitude of this horizontal current flow. If, however, the main current detecting coil 105 is located relatively close to the induction coils 103 and 104, which is assumed to be the case in the present embodiment, then there will also be a tendency for vertical current flow components in the drilling mud 13 to pass through the lateral passageway 105a and hence through the center hole of the coil 105. These vertical current components tend to flow down the drilling mud 13 on one side of the borehole 12, for example, the front side, and then to cross over and flow back up the drilling mud on the other side of the borehole 12. This type of vertical current flow is represented in a schematic manner by symbols 118a and 118b in the cross-sectional view of 10B, the symbol 118a representing a downward flow of current and the symbol 118b representing an upward flow of current. Any of this vertical current flow which crosses over through the center hole of the main current detecting coil 105 produces an error in the output signal appearing across the output terminals of this coil 105.

In the present embodiment, this error is minimized or substantially cancelled by the use of the two semi-toroidal current detecting coils 107 and 109. These coils 107 and 109 are constructed to detect vertical current flow in the drilling mud 13. The manner in which this is accomplished is indicated schematically in FIG. 10B. The vertical current flowing down the front side of the borehole, as represented by symbol 118a has associated therewith a magnetic flux field represented schematically by dash-line 119. This flux field passes through the core 108 of the upper semi-toroidal coil 107 and, consequently, produces across the output terminals of this coil 107 a signal which is proportional to the magnitude of the vertical current flow on the front side of the borehole 12 at the level of this coil 107. The lower semi-toroidal coil 109 operates in a similar manner. Since the upper semi-toroidal coil 107 measures the vertical current flow immediately above the main coil 105 and the lower semi-toroidal coil 109 measures the vertical current immediately below the main coil 105, any difference in the output signals developed by these two semi-toroidal coils 107 and 109 represents the amount of vertical current which has crossed over through the center hole of the main coil 105. Coils 107 and 109 are connected in a series opposing manner relative to one another to provide a net signal which is proportional to the vertical current crossing over through the main coil 105. The semi-toroidal coils 107 and 109 are connected in series with the main coil 105 with the appropriate polarity so that this net difference signal will cancel the erroneous signal component induced in the main coil 105 by the undesired vertical current flow. If the vertical current flow crossing over through the center hole of the main coil 105 is in the same direction as the desired horizontal current flow, then this net difference signal is subtracted from the signal induced across the main coil 105.

The relative number of turns, the sizes of the cores, etc., for the three coils 105, 107 and 109 are constructed to provide the necessary signal strength for obtaining the desired cancellation. In a symmetrical arrangement, the coil 107 will be identical in construction to the coil 109. If desired, additional signal strength for the semi-toroidal coils can be obtained by using a second semi-toroidal coil on the opposite side of the support member 101 from each of the coils 107 and 109. These additional coils would measure the vertical current flowing up the backside of the borehole 12. Such additional semi-toroidal coils would be connected in series with the other current detecting coils in the appropriate manner.

Undesired vertical current components in the drilling mud 13 are also minimized by the particular form of construction for the non-conductive fin members 112 and 113. In particular, different portions of the magnetic flux fields surrounding the induction coils 103 and 104 tend to induce vertical currents in the drilling mud 13 in opposite directions. With respect to a location such as that of the main current detecting coil 105 which is spaced apart from one end of these induction coils 103 and 104, these opposite polarity vertical components would not normally completely cancel one another since those produced by the magnetic field region below the induction coils 103 and 104 would be stronger at the location of the current detecting coil 105, thus producing some net vertical current flow. If, however, the non-conductive fin members are properly positioned and shaped to more predominantly block the stronger of the two vertical components, then a substantial reduction in the net vertical component can be provided at a selected distance from the induction coils 103 and 104, such as at a distance corresponding to the location of the current detecting coil 105. This reduction in vertical current flow is obtained with the fin members 112 and 113 since these fin members are located so as to reduce only the vertical current flow produced by the magnetic field regions above and below the induction coils 103 and 104. Consequently, the opposite polarity vertical components produced by the magnetic field regions to either side of the induction coils 103 and 104 are not reduced in strength and, hence, may more nearly cancel the vertical components produced by the end portions of the magnetic fields.

The signal compensation provided by the semi-toroidal coils 107 and 109 of the present embodiment are also useful for compensating for any change in current density for the case of a thin earth bed of one conductivity sandwiched between a pair of thicker earth beds of an appreciably different conductivity. As previously indicated, for the example of a thin highly conductive bed sandwiched between a pair of highly resistive earth beds, the dense current flow in the conductive bed will tend to spread out in a vertical direction as it crosses the borehole. This vertical spreading produces vertical components which are detected by the semi-toroidal coils 107 and 109. Since these vertical components produced by the spreading action are in opposite directions for the two coils 107 and 109, this produces changes in the output signals for the coils 107 and 109 which are of an additive or series-aiding nature. These additive changes are then automatically added in series with the signal across the main current detecting coil 105 so as to compensate for any decrease in the signal across the main coil 105 caused by the vertical spreading of the horizontal current as it crosses the borehole 12. Consequently, the vertical current compensation feature of the present embodiment is also useful with longer spacing coil systems whenever very thin earth beds are expected to be encountered.

Referring now to FIGS. 12 and 13 of the drawings, there is shown another embodiment of borehole investigating apparatus constructed in accordance with the present invention. This embodiment of apparatus utilizes a different method of minimizing vertical current flow components in the borehole 12. As seen in FIG. 12, this embodiment includes a borehole instrument 120 having a lower elongated support member 121 and an upper fluid-tight housing 122. A pair of side-by-side induction coils 123 and 124 are mounted within the support member 121. A toroidal-type current detecting coil 125 is mounted within the support member 121 encircling a lateral current flow passage 126 near the lower end thereof. This embodiment also includes a means for producing a vertical or longitudinal current flow in the borehole 12. This current producing means is represented by a second pair of side-by-side induction coils 127 and 128. This embodiment also includes a second current detecting means for detecting vertical or longitudinal current flow in the bore hole 12. This second current detecting means is represented by a semi-toroidal coil 129.

As seen in FIG. 13, the upper pair of induction coils 123 and 124 are energized by an alternating current signal generator 130. The horizontal current flow signal developed by the main current detecting coil 125 is supplied by way of an amplifier 131 to a phase sensitive detector 132. The phase sensitive detector 132 also receives a phase reference signal from the signal generator 130. The output side of phase sensitive detector 132 is coupled to an indicating device 133 located at the surface of the earth.

In order to minimize any vertical current flow in the borehole 12, the vertical current flow representative signal developed by the semi-toroidal coil 129 is used to excite the input of an amplifier 134, the output of which is used to drive the second pair of induction coils 127 and 128. Induction coil 127 is driven in an opposite polarity manner with respect to the first induction coil 123 located thereabove, while the lower induction coil 128 is driven in an opposite polarity manner with respect to the upper induction coil 124. As a result, the vertical current flow components generated by the lower pair of induction coils 127 and 128 will, at any given instant, be of opposite polarity to the vertical current flow components generated by the upper pair of coils 123 and 124. Consequently, the net vertical current flow at the level of the semi-toroidal coil 129 is reduced. The nature of the feedback loop formed by semi-toroidal coil 129, amplifier 134, and induction coils 127 and 128 is degenerative in nature. Consequently, this feedback system operates to reduce the net vertical current flow component at the level of the semi-toroidal coil 129 to a very small value approximating zero. To this end, the amplifier 134 is provided with a relatively high gain. Since the operation of this feedback system is automatic in nature, any changes in the vertical current component induced by the upper induction coils 123 and 124 will be automatically compensated.

Since the vertical current generating means represented by the second pair of induction coils 127 and 128 is not required to produce horizontal current flow components, this current producing means may assume other forms of construction. For example, a semi-toroidal coil similar to the coil 129 could instead be used.

While in the various embodiments heretofore described the main current detecting means has taken the form of a toroidal-type coil, other forms of current detecting means may sometimes be more advantageous. Consider, for example, the case where an oil base drilling mud is used in the borehole. Such oil base drilling muds are, for all practical purposes, substantially non-conductive. Consequently, while the induction coils would still induce current flow in the adjacent earth formations, substantially none of this current flow would cross the borehole proper. In this case, the current detecting means could instead take the form of a pair of side-by-side solenoid-type coils or preferably an array of such pairs of the same form as used for the induction coils. These current detecting coils would be aligned in the same manner as the induction coils. Such current detecting coils would serve to detect the electromagnetic flux fields produced by the horizontal currents flowing within the earth formations on either side of the borehole. This modified type of current detecting means would also be useful in empty boreholes which contain no drilling fluid.

Referring now to FIG. 14 of the drawings, there is shown a modified electrical circuit system which may be used with various ones of the previously-described embodiments of the invention. This modified electrical circuit system provides for a "reciprocal" operation of the coil system. The coil system is represented in a general manner in FIG. 14 by a pair of side-by-side solenoid-type coils 140 and 141 and a toroidal-type coil 142 longitudinally spaced apart therefrom. In order to provide a reciprocal operation, the toroidal coil 142 is used as the means for producing opposite polarity magnetic flux on opposite sides of the borehole. To this end, the toroidal coil 142 is energized by a signal generator 143 which supplies thereto alternating current of constant peak amplitude and constant frequency. The resulting flux in the core of toroidal coil 142 produces a relatively strong electric field through the center hole of the toroid. This in turn, produces a horizontal flow of current through the center hole of the toroid and, hence, across the borehole and into the adjacent earth formations. This horizontal current flow has associated therewith magnetic flux components which are vertically directed and which are of opposite polarity on the two sides of the borehole.

These opposite polarity magnetic flux components are detected by the side-by-side solenoid-type coils 140 and 141. Since the solenoid-type coils 140 and 141 are physically connected in an opposite polarity manner, these opposite polarity flux fields produce series-aiding signal polarities across the two coils 140 and 141. In other words, the signal voltages induced across the coils 140 and 141 add to one another to produce a resultant signal of approximately twice the amplitude of either taken separately. This resultant signal is proportional to the magnitude of that portion of the horizontal current flow generated by the toroidal coil 142 which penetrates relatively deeply into the adjacent earth formations. This occurs because it is only the current flow which penetrates relatively deeply which will affect the flux-detecting solenoid-type coils 140 and 141 in the appropriate manner.

The resultant horizontal current flow representative signal produced across the solenoid coils 140 and 141 is supplied by way of an amplifier 144 to a phase sensitive detector 145. A phase reference signal from the signal generator 143 is also supplied to the phase sensitive detector 145. The resulting direct-current signal appearing at the output of phase sensitive detector 145 is then supplied to an indicating device 146 located at the surface of the earth. Indicating device 146 thus provides an indication which is proportional to the electrical conductivity of the earth formation at the level of the current generating toroidal-type coil 142.

This reciprocal method of operation may be used with any of the FIG. 1, 8, 9 or 10 embodiments of the invention. If, as indicated in the FIG. 1 embodiment, two different toroidal coils are used to provide signals corresponding to two different lateral depths of investigation, then some means must be provided to distinguish the two different signals induced in the common pair of solenoid-type coils. This can be done by using separate signal generators for the two separate toroidal coils and operating these signal generators at different frequencies. Suitable frequency selective filters can then be used to separate the two signals induced in the common pair of solenoid coils. In the case of FIG. 9 embodiment where two pairs of solenoid-type coils are used, these two pairs together with their mentioned interconnections would be used in place of the single pair shown in FIG. 14. In the case of the FIG. 10 embodiment where three series interconnected current detecting coils are used to provide the output signals, these three series interconnected coils would be used in place of the single toroidal coil 142 shown in FIG. 14, the three coils serving, in this case, to generate the necessary horizontal current flow.

In describing the various embodiments of the present invention, the "longitudinal" direction in the borehole has at times been referred to as a "vertical" direction. Also, a "lateral" direction with respect to the borehole has frequently been referred to as a "horizontal" direction. This is convenient because the majority of boreholes are drilled in a vertical or very nearly vertical direction into the earth. It is recognized, however, that boreholes are sometimes deliberately deviated from a true vertical direction. It is to be understood, therefore, that for the case of a deviated borehole the terms "vertical" and "horizontal" are taken to mean "longitudinal" and "lateral," respectively. In other words, in the present specification and claims, physical directions are taken with respect to the borehole and, hence, may not coincide precisely with the true geographical directions.

While there have been described what are at present considered to be preferred embodiments of this invention, it will be obvious to those skilled in the art that various changes and modifications may be made therein without departing from the invention and it is, therefore, intended to cover all such changes and modifications as fall within the true spirit and scope of the invention.

What is claimed is:

1. In apparatus for investigating earth formations traversed by a borehole, the combination comprising: a support member adapted for movement through a borehole and including means for producing opposite polarity magnetic flux on opposite sides of the longitudinal axis of the borehole, said magnetic flux setting up a current flow on said opposite sides of the borehole; and means responsive to at least a portion of said current flow for providing an indication of electrical current flow in a lateral direction in or adjacent the borehole.

2. In apparatus for investigating earth formations traversed by a borehole, the combination comprising: a support member adapted for movement through a borehole and including means for producing opposite polarity longitudinally-directed alternating magnetic flux, on opposite sides of the longitudinal axis of the borehole, said magnetic flux setting up a current flow on said opposite sides of the borehole; and means longitudinally spaced apart from the flux producing means and responsive to at least a portion of said current flow for providing an indication of electrical current flow in a lateral direction in or adjacent the borehole.

3. In apparatus for investigating earth formations traversed by a borehole, the combination comprising: an elongated support member adapted for movement through the borehole; a first solenoid-type coil secured to the support member with its longitudinal axis parallel to but spaced from the longitudinal center axis of the support member to one side thereof; a second solenoid-type coil secured to the support member with its longitudinal axis parallel to but spaced from the longitudinal center axis of the support member to another side thereof; longitudinally spaced coil means secured to the support member and longitudinally spaced from both solenoid-type coils for either detecting or generating electrical current flow in a lateral direction in or adjacent the borehole; and means for energizing one of said longitudinally spaced coil means or said solenoid-type coils to generate said electrical current flow, the other of said coil means or solenoid-type coils adapted to detect at least a portion of said current flow.

4. In apparatus for investigating earth formations traversed by a borehole, the combination comprising: an elongated support member adapted for movement through the borehole; a pair of side-by-side solenoid-type coils secured to the support member with their longitudinal axes parallel to the longitudinal center axis of the support member; longitudinally spaced coil means secured to the support member and longitudinally spaced from the solenoid-type coils for either detecting or generating electrical current flow in a lateral direction in or adjacent the borehole; and means for energizing one of said longitudinally spaced coil means or said solenoid-type coils to generate said electrical current flow, the other of said coil means or solenoid-type coils adapted to detect at least a portion of said current flow.

5. In apparatus for investigating earth formations traversed by a borehole, the combination comprising: an elongated support member adapted for movement through the borehole; a first solenoid-type coil secured to the support member with its longitudinal axis parallel to but spaced from the longitudinal center axis of the support member to one side thereof; a second solenoid-type coil secured to the support member with its longitudinal axis parallel to but spaced from the longitudinal center axis of the support member to another side thereof; toroidal-type coil means secured to the support member and longitudinally spaced from both solenoid-type coils; and means for energizing either said solenoid-type coil means or said toroidal-type coil means to set up a current flow in the media surrounding said support member, the other of said solenoid-type coils or toroidal type coil adapted to detect at least part of said current flow.

6. In apparatus for investigating earth formations traversed by a borehole, the combination comprising: an elongated support member adapted for movement through the borehole; a first solenoid-type coil secured to the support member with its longitudinal axis parallel to but spaced from the longitudinal center axis of the support member to one side thereof; a second solenoid-type coil secured to the support member with its longitudinal axis parallel to but spaced from the longitudinal center axis of the support member to another side thereof; a pad member; means for coupling the pad member to the support member and adapted to urge the pad member against the borehole wall at a location longitudinally spaced from the solenoid-type coils; toroidal-type coil means secured to the pad member; and means for energizing one of said solenoid-type coils or said toroidal-type coil means to set up a current flow in a formation, the other of said solenoid-type coils or said toroidal-type coil adapted to detect at least a portion of said current flow.

7. In apparatus for investigating earth formations traversed by a borehole, the combination comprising: a support member adapted for movement through a borehole and including flux generating means for producing opposite polarity longitudinally-directed magnetic flux on opposite sides of the longitudinal axis of the borehole, said magnetic flux setting up a current flow on said opposite sides of the borehole; and current detecting means responsive to at least a portion of said current flow for providing an indication of electrical current flow in a lateral direction in or adjacent the borehole.

8. In apparatus for investigating earth formations traversed by a borehole, the combination comprising: a support member adapted for movement through a borehole and including means for generating a first electromagnetic flux field which is centered on one side of the longitudinal axis of the borehole; means for generating a second electromagnetic flux field which is centered on another side of the longitudinal axis of the borehole; and coil means for detecting electromagnetic effects produced by the combined flux fields.

9. In apparatus for investigating earth formations traversed by a borehole, the combination comprising: first induction means for inducing electrical current flow in the earth formations predominantly on one side of the borehole; second induction means for inducing electrical current flow in the earth formations predominantly on another side of the borehole; energizing circuit means coupled to the two induction means with relative polarities for causing portions of their respective earth currents to flow across the borehole in the same direction; and means for detecting the flow of earth currents across the borehole.

10. In apparatus for investigating earth formations traversed by a borehole, the combination comprising: a first solenoid-type induction coil aligned with its longitudinal axis parallel to but spaced apart from the longitudinal center axis of the borehole on one side thereof for inducing electrical current flow in the earth formations predominantly on this one side of the borehole; a second solenoid-type induction coil aligned with its longitudinal axis parallel to but spaced apart from the longitudinal center axis of the borehole on another side thereof for inducing electrical current flow in the earth formations predominantly on this other side of the borehole; energizing circuit means coupled to the two induction coils with relative polarities for causing portions of their respective earth currents to flow across the borehole in the same direction; and means for detecting the flow of earth currents across the borehole.

11. In apparatus for investigating earth formations traversed by a borehole, the combination comprising; a pair of side-by-side solenoid-type induction coils aligned with their longitudinal axes parallel to the longitudinal center axis of the borehole for inducing electrical current flow in the earth formations on their respective sides of the borehole; energizing circuit means coupled to the two induction coils with relative polarities for causing portions of their respective earth currents to flow across the borehole in the same direction; and means for detecting the flow of earth currents across the borehole.

12. In apparatus for investigating earth formations traversed by a borehole, the combination comprising; a pair of side-by-side solenoid-type induction coils aligned with their longitudinal axes parallel to the longitudinal center axis of the borehole for inducing electrical current flow in the earth formations on their respective sides of the borehole; energizing circuit means for energizing the two induction coils in an opposite polarity manner for causing portions of their respective earth currents to flow across the borehole in the same direction; and coil means having a toroidal core for detecting the flow of earth currents across the borehole.

13. In apparatus for investigating earth formations traversed by a borehole, the combination comprising: an elongated support member adapted for movement through the borehole; first induction means secured to the support member on one side of the longitudinal center axis thereof; second induction means secured to the support member on another side of the longitudinal center axis thereof; means for energizing both of said induction means to induce current in at least one formation; and current detecting means secured to the support member and longitudinally spaced from both induction means for detecting at least a portion of said induced current.

14. In apparatus for investigating earth formations traversed by a borehole, the combination comprising: an elongated support member adapted for movement through the borehole; a first solenoid-type induction coil secured to the support member with its longitudinal axis parallel to but spaced from the longitudinal center axis of the support member to one side thereof; a second solenoid-type induction coil secured to the support member with its longitudinal axis parallel to but spaced from the longitudinal center axis of the support member to another side thereof; means for energizing both of said soils to induce current in at least one formation; and current detecting means secured to the support member and longitudinally spaced from both induction coils for detecting at least a portion of said induced current.

15. In apparatus for investigating earth formations traversed by a borehole, the combination comprising: an elongated support member adapted for movement through the borehole; a first solenoid-type induction coil having an elongated ferromagnetic core secured to the support member with its longitudinal axis parallel to but spaced from the longitudinal center axis of the support member to one side thereof; a second solenoid-type induction coil having an elongated ferromagnetic core secured to the support member with its longitudinal axis parallel to but spaced from the longitudinal center axis of the support member to another side thereof; means for energizing both of said coils to induce current in at least one formation; and current detecting means secured to the support member and longitudinally spaced from both induction coils for detecting at least a portion of said induced current.

16. In apparatus for investigating earth formations traversed by a borehole, the combination comprising: an elongated support member adapted for movement through the borehole; a pair of side-by-side solenoid-type induction coils secured to the support member with their longitudinal axes parallel to the longitudinal center axis of the support member; means for energizing both of said coils to induce current in at least one formation; and current detecting means secured to the support member and longitudinally spaced from the induction coils for detecting at least a portion of said induced current.

17. In apparatus for investigating earth formations traversed by a borehole, the combination comprising: an elongated support member adapted for movement through the borehole; a first pair of side-by-side solenoid-type induction coils secured to the support member with their longitudinal axes parallel to the longitudinal center axis of the support member; a second pair of side-by-side solenoid-type induction coils secured to the support member with their longitudinal axes parallel to the longitudinal center axis of the support member, the second pair being longitudinally spaced apart from the first pair; and current detecting means secured to the support member and longitudinally spaced apart from both pairs of induction coils.

18. In apparatus for investigating earth formations traversed by a borehole, the combination comprising: an elongated support member adapted for movement through the borehole; first induction means secured to the support member on one side of the longitudinal center axis thereof; second induction means secured to the support member on another side of the longitudinal center axis thereof; means for energizing said induction means to induce current in a formation; first current detecting means secured to the support member and longitudinally spaced from the the induction means for detecting at least a portion of said induced current; and second current detecting means secured to the support member at a substantially greater longitudinal distance from the induction means than is the first current detecting means for detecting at least a portion of said induced current.

19. In apparatus for investigating earth formations traversed by a borehole, the combination comprising: an elongated support member adapted for movement through the borehole; first induction means secured to the support member on one side of the longitudinal center axis thereof; second induction means secured to the support member on another side of the longitudinal center axis thereof; means for energizing said induction means to induce current in a formation; and current-detecting coil means having a toroidal core secured to the support member and longitudinally spaced from both induction means for detecting at least a portion of said induced current.

20. In apparatus for investigating earth formations traversed by a borehole, the combination comprising: an elongated support member adapted for movement through the borehole; a first solenoid-type induction coil secured to the support member with its longitudinal axis parallel to but spaced apart from the longitudinal center axis of the support member on one side thereof; a second solenoid-type induction coil secured to the support member with its longitudinal axis parallel to but spaced apart from the longitudinal center axis of the support member on the opposite side thereof; and current-detecting coil means having a toroidal core secured to the support member and longitudinally spaced apart from both induction coils with the toroidal core parallel to the plane defined by the longitudinal axes of the induction coils.

21. In apparatus for investigating earth formations traversed by a borehole, the combination comprising: an elongated cylindrical non-conductive support member adapted for movement through the borehole; a first solenoid-type induction coil mounted within the support member with its longitudinal axis parallel to but spaced apart from the longitudinal center axis of the support member on one side thereof; a second solenoid-type induction coil mounted within the support member with its longitudinal axis parallel to but spaced apart from the longitudinal center axis of the support member on the opposite side thereof; a lateral passageway extending through the support member at a location longitudinally spaced apart from the induction coils; a toroidal core mounted within the support member encircling the lateral passageway; and a coil winding wound around at least a portion of the toroidal core.

22. In apparatus for investigating earth formations traversed by a borehole, the combinattion comprising: an elongated cylindrical non-conductive support member adapted for movement through the borehole; a first solenoid-type induction coil mounted withtin the support member with its longitudinal axis parallel to but spaced apart from the longitudinal center axis of the support member on one side thereof; a second solenoid-type induction coil mounted within the support member with its longitudinal axis parallel to but spaced apart from the longitudinal center axis of the support member on the opposite side thereof; a lateral passageway extending through the support member at a location longitudinally spaced apart from the induction coils, the center axis of the lateral passageway being perpendicular to the plane defined by the longitudinal axes of the induction coils; a toroidal core mounted within the support member encircling the lateral passageway; and a coil winding wound around at least a portion of the toroidal core.

23. In apparatus for investigating earth formations traversed by a borehole, the combination comprising: an elongated support member adapted for movement through the borehole; first induction means secured to the support member on one side of the longitudinal center axis thereof; second induction means secured to the support member on another side of the longitudinal center axis thereof; a pad member; means for coupling the pad member to the support member and adapted to urge the pad member against the borehole wall at a location longitudinally spaced from the induction means; means for energizing said induction means to induce current in a formation; and current detecting means secured to the pad member for detecting at least a portion of said induced current.

24. In apparatus for investigating earth formations traversed by a borehole, the combination comprising: an elongated support member adapted for movement through the borehole; first induction means secured to the support member on one side of the longitudinal center axis thereof; second induction means secured to the support member on another side of the longitudinal center axis thereof; a pad member; means for coupling the pad member to the support member and adapted to urge the pad member against the borehole wall at a location longitudinally spaced from the induction means; means for energizing said induction means to induce current in a formation; and current-detecting coil means having a toroidal core secured to the pad member for detecting at least a portion of said induced current.

25. In apparatus for investigating earth formations traversed by a borehole, the combination comprising: an elongated support member adapted for movement through the borehole; first induction means secured to the support member on one side of the longitudinal center axis thereof; second induction means secured to the support member on another side of the longitudinal center axis thereof; means for energizing said induction means to induce current in a formation; current detecting means secured to the support member and longitudinally spaced from both induction means for detecting at least a portion of said induced current; and nonconductive current-blocking means secured to the support member adjacent the induction means and extending radially outward from the body of the support member.

26. In apparatus for investigating earth formations traversed by a borehole, the combination comprising: an elongated support member adapted for movement through the borehole; first induction means secured to the support member on one side of the longitudinal center axis thereof; second induction means secured to the support member on another side of the longitudinal center axis thereof; means for energizing said induction means to induce current in a formation; current detecting means secured to the support member and longitudinally spaced from both induction means for detecting at least a portion of said induced current; and a pair of non-conductive fin members secured to the support member adjacent the induction means and individually extending radially outward from the body of the support member.

27. In apparatus for investigating earth formations traversed by a borehole, the combination comprising: an elongated support member adapted for movement through the borehole; a first induction coil secured to the support member on one side of the longitudinal center axis thereof; a second induction coil secured to the support member on the other side of the longitudinal center axis thereof; circuit means for energizing the two induction coils in an opposite polarity member to set up opposite polarity current flow on opposite sides of a borehole; current detecting means secured to the support member and longitudinally spaced from both induction coils for detecting at least a portion of said current flow; and means for providing indications representative of any detected current.

28. In apparatus for investigating earth formations traversed by a borehole, the combination comprising: an elongated support member adapted for movement through the borehole; a first solenoid-type induction coil secured to the support member with its longitudinal axis parallel to but spaced from the longitudinal center axis of the support member to one side thereof; a second solenoid-type induction coil secured to the support member with its longitudinal axis parallel to but spaced from the longitudinal center axis of the support member to another side thereof; circuit means for energizing the two induction coils in an opposite polarity manner to set up opposite polarity current flow on opposite sides of a borehole; current detecting means secured to the support member and longitudinally spaced from both induction coils for detecting at least a portion of said current flow; and means for providing indications representative of any detected current.

29. In apparatus for investigating earth formations traversed by a borehole, the combination comprising: an elongated support member adapted for movement through the borehole; a first induction coil secured to the support member on one side of the longitudinal center axis thereof; a second induction coil secured to the support member on the other side of the longitudinal center axis thereof; circuit means for energizing the two induction coils in an opposite polarity manner to set up opposite polarity current flow on opposite sides of a borehole; current detecting means secured to the support member and longitudinally spaced from both induction coils for providing a signal representative of any current flow across the borehole at this longitudinal location; nonlinear function former means for modifying the current-representative signal; and means for the providing indications representative of the modified current-representative signal.

30. In apparatus for investigating earth formations traversed by a borehole, the combination comprising: an elongated support member adapted for movement through the borehole; a first induction coil secured to the support member on one side of the longitudinal center axis thereof; a second induction coil secured to the support member on the other side of the longitudinal center axis thereof; circuit means for energizing the two induction coils in an opposite polarity manner to set up opposite polarity current flow on opposite sides of a borehole; first current detecting means secured to the support member and longitudinally spaced from the induction coils for detecting at least a portion of said current flow; second current detecting means secured to the support member at a substantially greater longitudinal distance from the induction coils than is the first current detecting means for detecting at least a portion of said current flow; and means for providing separate indications individually representative of any currents detected by the two current detecting means.

31. In apparatus for investigating earth formations traversed by a borehole, the combination comprising: an elongated support member adapted for movement through the borehole; a first pair of side-by-side solenoid-type induction coils secured to the support member with their longitudinal axes parallel to the longitudinal center axis of the support member; circuit means for energizing the first two induction coils in an opposite polarity manner to set up opposite polarity current flow on opposite sides of a borehole; a second pair of side-by-side solenoid-type induction coils secured to the support member with their longitudinal axes parallel to the longitudinal center axis of the support member, each coil of the second pair being located directly below one of the coils of the first pair; circuit means for energizing the second two induction coils with each coil of the second pair being energized in an opposite polarity manner with respect to the coil of the first pair directly above it so as to set up a current flow of opposite polarity from that set up by the coil directly above it; current detecting means secured to the support member and longitudinally spaced from both pairs of induction coils for detecting at least a portion of said current flow; and means for providing indications representative of any detected current.

32. In apparatus for investigating earth formations traversed by a borehole, the combination comprising: a support member adapted for movement through a borehole and including means for producing opposite polarity longitudinally-directed magnetic flux on opposite sides of the longitudinal axis of the borehole, said magnetic flux setting up a current flow on said opposite sides of the borehole; means for providing an indication of that portion of the electrical current which flows across at least a portion of the borehole ;and means for minimizing the effect on the current flow indication of any longitudinal current flow in the borehole.

33. In apparatus for investigating earth formations traversed by a borehole, the combination comprising: a support member adapted for movement through a borehole and including means for producing opposite polarity longitudinally-directed magnetic flux on opposite sides of the longitudinal axis of the borehole, said magnetic flux setting up a current flow on said opposite sides of the borehole; means for providing an indication of that portion of the electrical current which flows across at least a portion of the borehole; and means for modifying the current flow indication to minimize any component thereof resulting from longitudinal current flow in the borehole.

34. In apparatus for investigating earth formations traversed by a borehole, the combination comprising: a support member adapted for movement through a borehole and including means for producing opposite polarity longitudinally-directed magnetic flux on opposite sides of the longitudinal axis of the borehole, said magnetic flux setting up a current flow on said opposite sides of the borehole; means for providing an indication of that portion of the electrical current which flows across at least a portion of the borehole; and means for minimizing any longitudinal current flow in the borehole in the vicinity of the current flow indicating means.

35. In apparatus for investigating earth formations traversed by a borehole, the combination comprising: an elongated support member adapted for movement through the borehole; a first induction coil secured to the support member on one side of the longitudinal center axis thereof; a second induction coil secured to the support member on the other side of the longitudinal center axis thereof; circuit means for energizing the two induction coils in an opposite polarity manner to set up opposite polarity current flow on opposite sides of a borehole; first current detecting means secured to the support member and longitudinally spaced from both induction coils for detecting at least a portion of said electrical current which flows across at least a portion of the borehole; second current detecting means secured to the support member for detecting at least a portion of said current which flows longitudinally in the borehole; and means for modifying the current flow indication provided by the first current detecting means as a function of any detected longitudinal current flow for minimizing any component thereof resulting from such longitudinal current flow.

36. In apparatus for investigating earth formations traversed by a borehole, the combination comprising: an elongated support member adapted for movement through the borehole; a first induction coil secured to the support member on one side of the longitudinal center axis thereof; a second induction coil secured to the support member on the other side of the longitudinal center axis thereof; circuit means for energizing the two induction coils in an opposite polarity manner to set up opposite polarity current flow on opposite sides of a borehole; toroidal-type coil means secured to the support member and longitudinally spaced from both induction coils for detecting that portion of the electrical current which flows across at least a portion of the borehole; coil means secured to the support member for detecting any difference in longitudinal current flow in the borehole immediately above and immediately below the toroidal-type coil means; means for subtracting any difference in longitudinal current flow from the current flow indication provided by the toroidal-type coil means; and means for providing an indication representative of the resultant current flow indication.

37. In apparatus for investigating earth formations traversed by a borehole, the combination comprising: an elongated support member adapted for movement through the borehole; a first induction coil secured to the support member on one side of the longitudinal center axis thereof; a second induction coil secured to the support member on the other side of the longitudinal center axis thereof; circuit means for energizing the two induction coils in an opposite polarity manner to set up opposite polarity current flow on opposite sides of a borehole; first current detecting means secured to the support member and longitudinally spaced from both induction coils for detecting that portion of the electrical current which flows across at least a portion of the borehole; second current detecting means secured to the support member for detecting at least a portion of said current which flows longitudinally in the borehole; means for producing longitudinal current flow in the borehole; and circuit means responsive to any longitudinal current flow detected by the second current detecting means for adjusting the current flow produced by the longitudinal current producing means to minimize such detected longitudinal current flow.

38. In apparatus for investigating earth formations traversed by a borehole, the combination comprising: a support member adapted for movement through a borehole and including means for producing opposite polarity longitudinally-directed magnetic flux on opposite sides of the longitudinal axis of the borehole, said magnetic flux setting up a current flow on said opposite sides of the borehole; and flux detecting means for providing an indication of the magnetic flux set up by that portion of the electrical current which flows across at least a portion of the borehole.

39. In apparatus for investigating earth formations traversed by a borehole, the combination comprising: a support member adapted for movement through a borehole and including means for generating a horizontal flow of electrical current which crosses the borehole and returns through the adjacent earth formations; and means vertically spaced from the generating means for providing an indication of the vertical magnetic flux component produced by said current on at least one side of the borehole.

40. In apparatus for investigating earth formations traversed by a borehole, the combination comprising: a support member adapted for movement through a borehole and including coil means having a toroidal core for producing a horizontal flow of electrical current which crosses the borehole and returns through the adjacent earth formation; and means vertically spaced from the coil means for providing an indication of the vertical magnetic flux component produced by said current on at least one side of the borehole.

41. In apparatus for investigating earth formations traversed by a borehole, the combination comprising: an elongated support member adapted for movement through the borehole; first magnetic flux detecting means secured to the support member on one side of the longitudinal center axis thereof; second magnetic flux detecting means secured to the support member on another side of the longitudinal center axis thereof; and means secured to the support member and longitudinally spaced apart from both flux detecting means for producing a lateral flow of electrical current which crosses the borehole and returns through the adjacent earth formation.

42. In apparatus for investigating earth formations traversed by a borehole, the combination comprising: an elongated support member adapted for movement through the borehole; first magnetic flux detecting means secured to the support member on one side of the longitudinal center axis thereof; second magnetic flux detecting means secured to the support member on another side of the longitudinal center axis thereof; and coil means having a toroidal core secured to the support member and longitudinally spaced apart from both flux detecting means for producing a lateral flow of electrical current which crosses the borehole and returns through the adjacent earth formation.

43. In apparatus for investigating earth formations traversed by a borehole, the combination comprising: an elongated support member adapted for movement through the borehole; a first solenoid-type coil secured to the support member with its longitudinal axis parallel to but spaced apart from the longitudinal center axis of the support member on one side thereof; a second solenoid-type coil secured to the support member with its longitudinal axis parallel to but spaced apart from the longitudinal center axis of the support member on another side thereof; means secured to the support member and longitudinally spaced apart from both solenoid-type coils for producing electrical current flow across the borehole; circuit means for energizing the current producing means; and means coupled to the two solenoid-type coils for providing indications representative of any vertical magnetic flux components detected by such coils.

References Cited

UNITED STATES PATENTS

| | | | |
|---|---|---|---|
| 2,220,788 | 11/1940 | Lohman | 324—6 |
| 2,251,900 | 8/1941 | Smith | 324—6 |
| 2,297,568 | 9/1942 | Leonardon | 324—8 XR |
| 2,428,155 | 9/1947 | Guyod | 324—6 |
| 2,716,730 | 8/1955 | Williams | 324—8 |
| 2,897,438 | 7/1959 | Fearon. | |
| 2,987,668 | 6/1961 | Gondouin | 324—6 |
| 3,052,835 | 9/1962 | Dunlap et al. | 324—6 XR |

GERARD R. STRECKLER, Primary Examiner